US006489742B2

(12) United States Patent
Lumsden

(10) Patent No.: US 6,489,742 B2
(45) Date of Patent: Dec. 3, 2002

(54) EFFICIENCY MAXIMIZING MOTOR CONTROLLER AND METHOD

(75) Inventor: John Lumsden, 18027 Clear Brook Cir., Boca Raton, FL (US) 33498

(73) Assignees: John Lumsden, Naples, FL (US); Melvin L. Kanar, Naples, FL (US)

( * ) Notice: Subject to any disclaimer, the term of this patent is extended or adjusted under 35 U.S.C. 154(b) by 0 days.

(21) Appl. No.: 09/748,773

(22) Filed: Dec. 26, 2000

(65) Prior Publication Data

US 2002/0079859 A1 Jun. 27, 2002

(51) Int. Cl.$^7$ .................................................. H02P 1/24
(52) U.S. Cl. ........................ 318/727; 318/729; 318/767; 318/789; 318/798; 318/805; 318/812
(58) Field of Search ................. 318/727, 729, 318/767, 789, 798, 865, 812

(56) References Cited

U.S. PATENT DOCUMENTS

| | | |
|---|---|---|
| 4,190,793 A | 2/1980 | Parker et al. |
| 4,242,625 A | 12/1980 | Hedges |
| 4,297,628 A | 10/1981 | Hedges |
| 4,341,984 A | 7/1982 | Parker et al. |
| 4,382,223 A | 5/1983 | Hedges |
| 4,414,499 A | 11/1983 | Hedges |
| 4,636,702 A | 1/1987 | Hedges |
| 4,864,212 A | 9/1989 | Parker |
| 5,249,118 A | 9/1993 | Smith |
| 5,612,605 A | 3/1997 | Tao |
| 5,723,966 A | 3/1998 | Straka et al. |
| 5,737,762 A * | 4/1998 | Hattori ........................ 318/560 |
| 5,841,641 A | 11/1998 | Faulk |
| 5,923,728 A | 7/1999 | Ikkai et al. |
| 5,949,202 A | 9/1999 | Vlahu |
| 5,978,547 A | 11/1999 | Reynolds et al. |
| 5,986,419 A | 11/1999 | Archer et al. |
| 6,175,465 B1 * | 1/2001 | Kawachi et al. ......... 360/77.08 |

* cited by examiner

*Primary Examiner*—Karen Masih
(74) *Attorney, Agent, or Firm*—Edward M. Livingston, Esq.

(57) ABSTRACT

An efficiency-maximization motor controller that includes a use method has power conveyance to an induction motor (1) with a digital signal processor (DSP) (8) that calculates and optimizes supply of current for existent motor loading from a power supply (2) and mains voltage through a control element (5). The control element can include a standard triac, a field-effect transistor, an insulated gate bipolar transistor, a 3 quadrant triac or other select control element. Digital calculation and motor-control feedback of current requirements for motor loading and other motor parameters are calculated in millionths of seconds to provide motor-current optimization for all motor-use conditions. Calculation of motor-load requirement for current and supply of that current are effectively simultaneous.

18 Claims, 22 Drawing Sheets

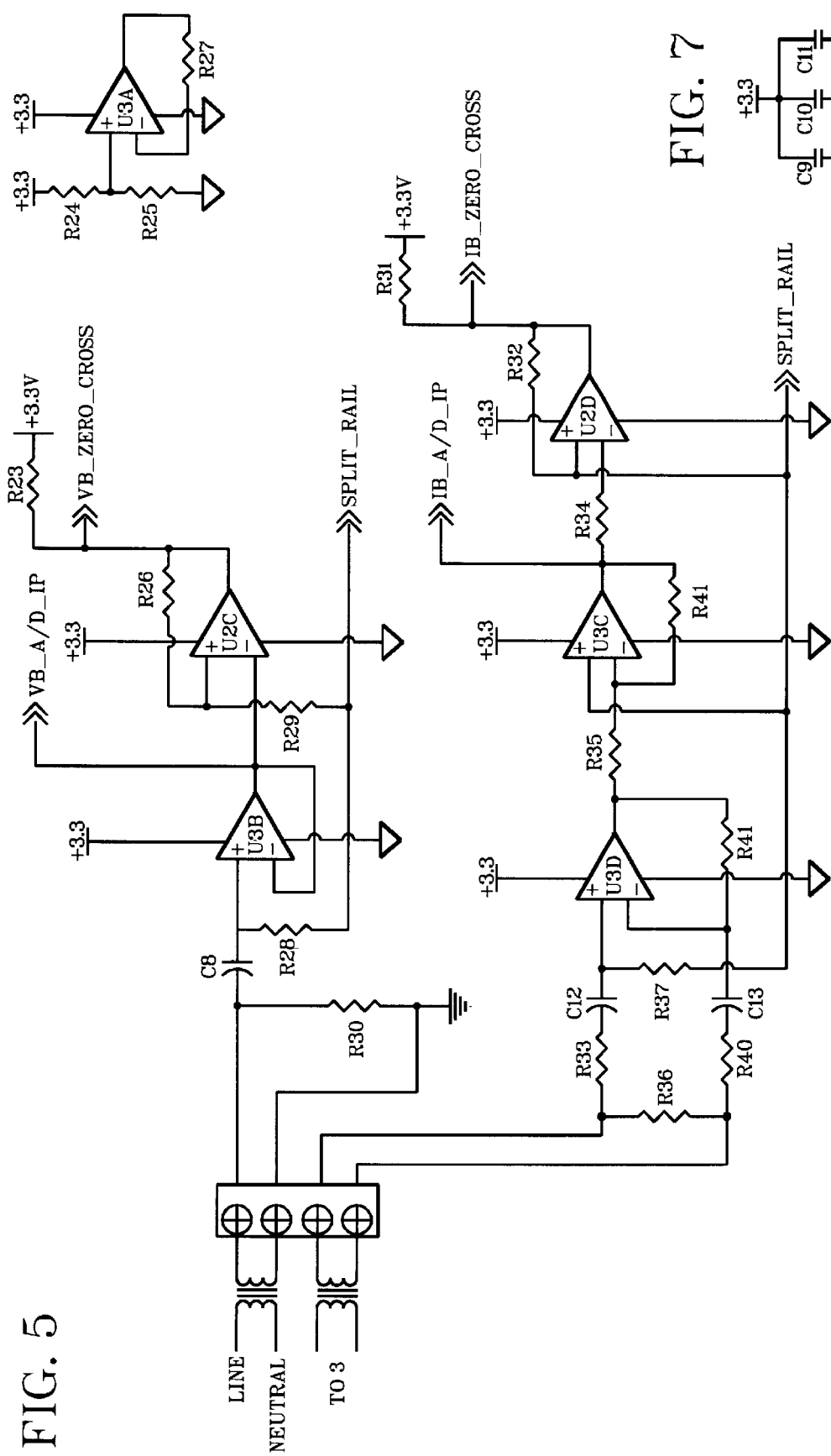
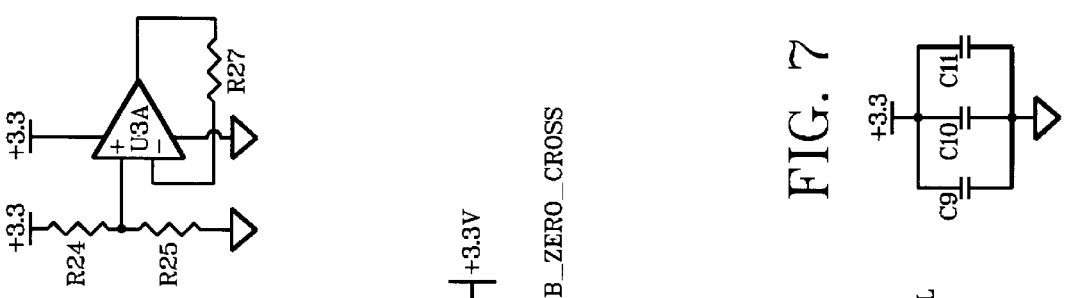
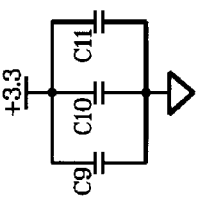

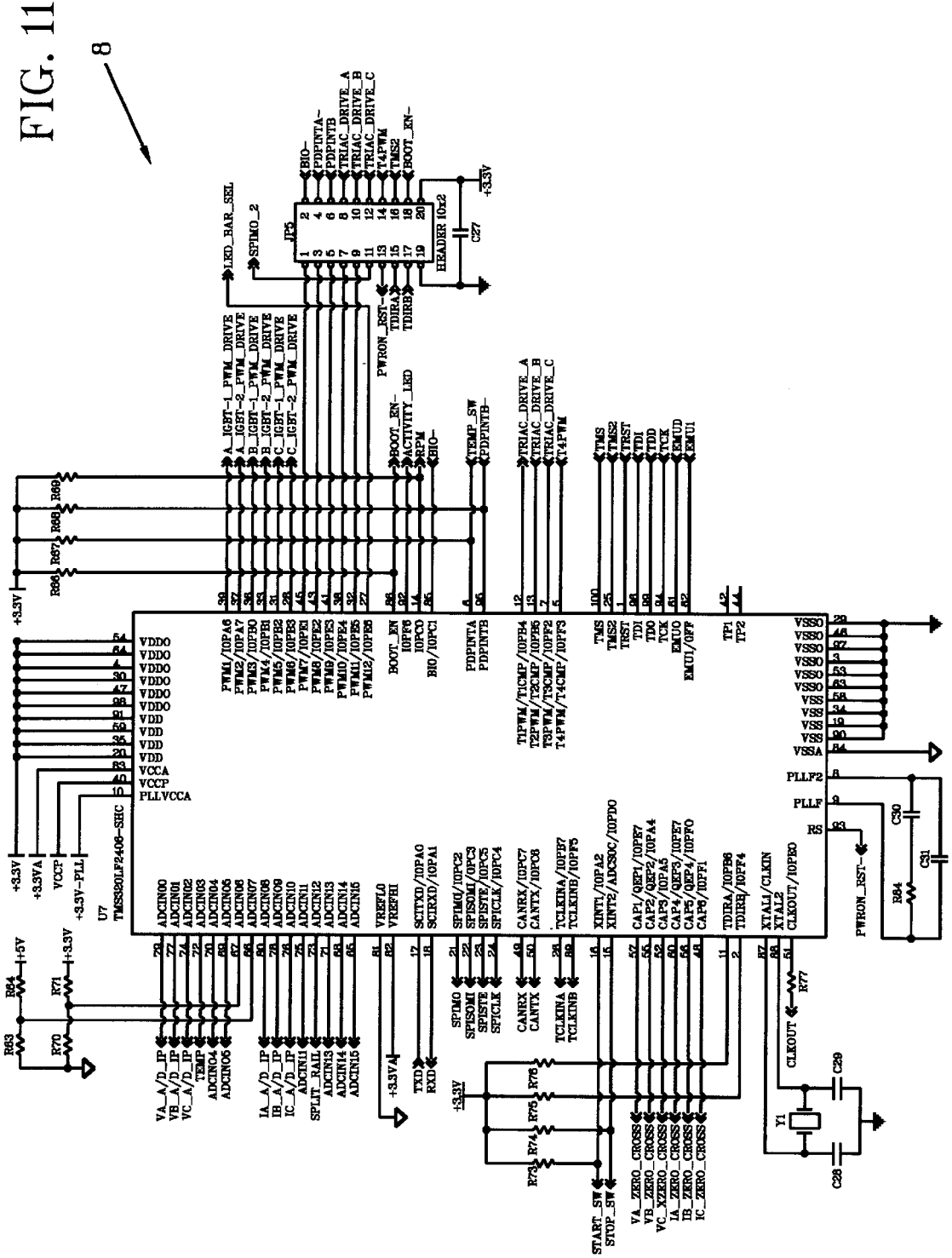

FIG. 11A

EFFICIENCY MAXIMIZING MOTOR CONTROLLER AND METHOD

BACKGROUND OF THE INVENTION

This invention relates to control of electrical current for efficiency increase and protective powering of electrical motors.

Potential for increase in efficiency of electrical motors by regulation of current for their operation has resulted in a variety of motor-electric controllers for its accomplishment. None, however, computes on a microsecond basis the motor-loading needs of electrical motors for electrical current and, accordingly, optimizes the electrical current supplied for predetermined rotational speeds of the motors and, in addition, provide operational analyses and fault protection against hazzards to motors and to rotationally coupled devices in a manner taught by this invention.

Examples of most-closely related known but yet different motor-electric controllers are described in the following patent documents. U.S. Pat. No. 5,249,118, issued to Smith on Sep. 28, 1993, described input control of current for a rotational-speed controller that also controlled rate of increase and decrease of rotational speed for computer-controlled machinery. It is representative of a plurality of patents and prior art that relate to control of speed with control of input current in contrast to Applicants' invention for optimization-control of current for predetermined rotational speed of motors. In the Smith patent, as in other variable-speed motors, current to the motors is not optimized at the variable speeds in a manner taught by this invention. Logic, methods and features for accomplishing speed control differ accordingly from the current-optimization control for predetermined speed described by Applicants.

Current control for economizing power of motors at operational speeds by control of input current with yet different logic, methods and features are described in the following patent documents. U.S. Pat. No. 4,864,212, issued to Parker on Sep. 5, 1989, described a sine wave power source connected through a triac to a control system with a gate electrode which is energized by a train (sequence) of sawtooth-shaped control signals having a repetition rate which is twice the frequency of the sine wave power source for providing short bursts of energy to decrease total power input for low power requirements at low fixed rates for variable rates of low-speed operation. U.S. Pat. No. 4,636,702, issued to Hedges on Jan. 13, 1987, described a sample transformer operative to generate a voltage pulse related to inrush-current parameters for control of portions of sine waves of power input to stator windings for diminishing electrical current to a motor during low loading. It is limited further to a "manually settable means" for selecting a maximum value of motor torque during start mode of operation. U.S. Pat. No. 4,382,223, issued to Hedges on May 3, 1983, and an improvement thereof, U.S. Pat. No. 4,414,499 issued to Hedges on Nov. 8, 1983, described use of a small AC generator coupled to a rotor of an electric motor to produce a signal for controlling a sine wave modifier to regulate current to the motor in accordance with load requirements. The load requirements were determined by a difference between an optimal RPM for the motor and an RPM indicated by the small AC generator. U.S. Pat. No. 4,341,984, issued to Parker, et al. on Jul. 27, 1982, is based on a frequency controller to produce at least two output frequencies for different speeds of operation of a motor. Other U.S. patents issued to Parker and/or Hedges, have employed variations of those indicated above.

SUMMARY OF THE INVENTION

Objects of patentable novelty and utility taught by this invention are to provide an efficiency-maximizing motor controller and method which:

provides soft starts of motors for eliminating extra power consumption, for decreasing motor wear and for decreasing wear of devices coupled to the motors from full-power, fast startups of motors. The time duration of the ramp-up is user configurable in software to suit the application;

provides consumption of bare minimum amounts of electrical power for selectively no-load and part-load operation of motors at design motor speeds in order to save up to seventy percent of electrical power required for full-load operation;

provides motor-parameter off-switching and selective on-switching for fault protection against power surges by use of semiconductor transient suppressors, power deficiencies including low and high mains voltages, motor stalling by sensing both current and phase difference between voltage and current, overload over time and based on previously acquired data known, that characterizes the motor being controlled, excessive heat or cold and other extraneous problems;

provides analyses of motor-operation factors and efficiencies by communicating comprehensive monitored parameters to a personal computer connected individually by wired or wireless means or via a network connected by wired or wireless means and running a variety of protocols listed elsewhere in this document. The following list includes but not limited to the parameters and conditions available for observation or record:

1) Mains Volts (true RMS)
2) Mains Volts DC offset
3) Mains Current (true RMS)
4) True Watts
5) Volt Ampers
6) Power Factor
7) Reactive Factor
8) Motor Volts (true RMS)
9) Motor Volts DC offset
10) Motor Peak Volts
11) Motor Peak Current
12) Motor Hours Duration Run
13) Calculation of power savings (user KWH rate selected)
14) Manual Parametric adjustment of controller
15) Manual selection of start options (soft start and random start)
16) Manual selections of Fault condition Options
17) Calibration of:
   a Mains Volts
   b Mains Volts offset
   c Motor volts
   d. Motor Volts offset
18) Power savings method selection, Managed or Fixed Voltage reduction
19) Bar graph to indicate savings using 8 LED red to indicate no savings, amber to indicate moderate savings, 6 green to indicate degree of savings e.g. all on maximum savings
20) Use of both digital and analog gauges for display decreases motor power use and costs;

decreases [w]World need and consumption of electrical power; and can be used on both single-phase and three-phase motors and on nearly all sizes of motors for nearly all consumer, commercial and industrial applications of motors.

This invention accomplishes these and other objectives with an efficiency-maximizing motor controller and method in which an induction motor has a 40 MIPS (40 million instructions per second) digital signal processor (DSP) that calculates and optimizes supply of current for existent motor loading from a mains voltage through a current-control element. The current-control element can include a standard triac, a field-effect transistor, an insulated gate bipolar transistor, a 3 quadrant triac or other select control element together with an additional back EMF (Electro Motive Force) clamping device that is connected across the motor itself. This device has to be an IGBT or Field Effect Transistor since the DSP needs to control the on and off point of this device within the back EMF portion of the motors induction cycle every half cycle period of the mains. This novel technique assures that the energy contained in the motor (the back EMF) is contained in the motor and not returned to the mains as is presently the case. This technique obviously improves the efficiency since mains power is not used at all during the back EMF cycle. Moreover, the power factor, clearly, is improved as a result. When an IGBT or a field effect transistor is employed as the energy control element further savings are possible and a further improvement of power factor will result. Application of this class of device, as previously stated, has the ability to turn on and off under the control of the DSP. This means that, unlike the Triac or SCR (Thyristor) the energy supplied to the motor, which is the "area under the curve", can be placed at a user's discretion during the sine wave half-cycle of the mains. Such control allows a more constant power factor to be achieved, similar to the motor under conditions of direct connection to the mains, at all motor loads.

An induction motor rotating unloaded is predominately an inductor. In this state, the only work being done is to overcome frictional losses and inertial kinetic energy necessary to maintain rotation. Being largely inductive in this state, current lags voltage by nearly ninety degrees. As the motor is loaded increasingly, a phase difference of current lag diminishes. This is a change in phase angle from near ninety degrees to an angle approaching zero degrees of current lag, Accurately computed with artificial intelligence, this change in phase angle is an accurate measure of motor load for which current is required for operation at an optimum rotational speed.

This invention uses this and other motor characteristics, including DC offset and current to calculate optimum firing angles, firing durations and firing current for dynamically adaptive triacs and other control elements in order to achieve motor horsepower adaptively to its work loading at the optimum rotational speed. Digital calculation and motor-control feedback of this and other motor parameters in millionths of seconds with this invention provide motor-current optimization for all motor-use conditions of loading. Calculation of motor-load requirement for current and supply of that current are effectively simultaneous. Every calculation and control instruction are done within the half cycle period of the mains.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

FIG. 5 is an electrical diagram of an analog signal conditioner phase "B";

FIG. 6 is an electrical diagram of a second amplifier stage for the FIG. 5 signal conditioner;

FIG. 7 is an electrical diagram of a second capacitor for the FIG. 5 ground virtual circuit;

Figure 11A:
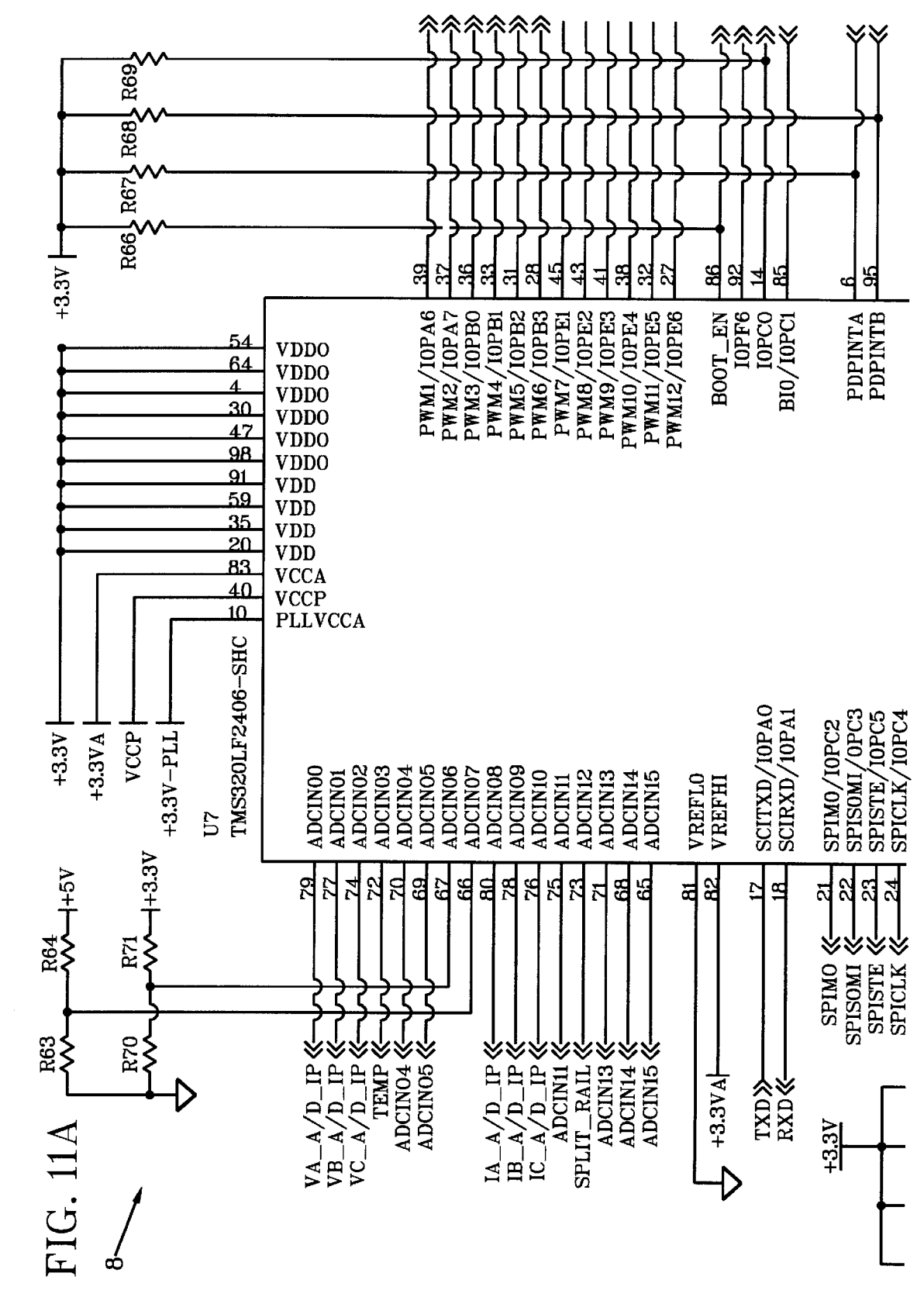

FIG. 11 is a shrunk diagram of a digital signal processor (DSP);

FIG. 11A is an un-shrunk diagram of a top-left portion of the FIG. 11 shrunk diagram;

DESCRIPTION OF PREFERRED EMBODIMENT

Figure 1:
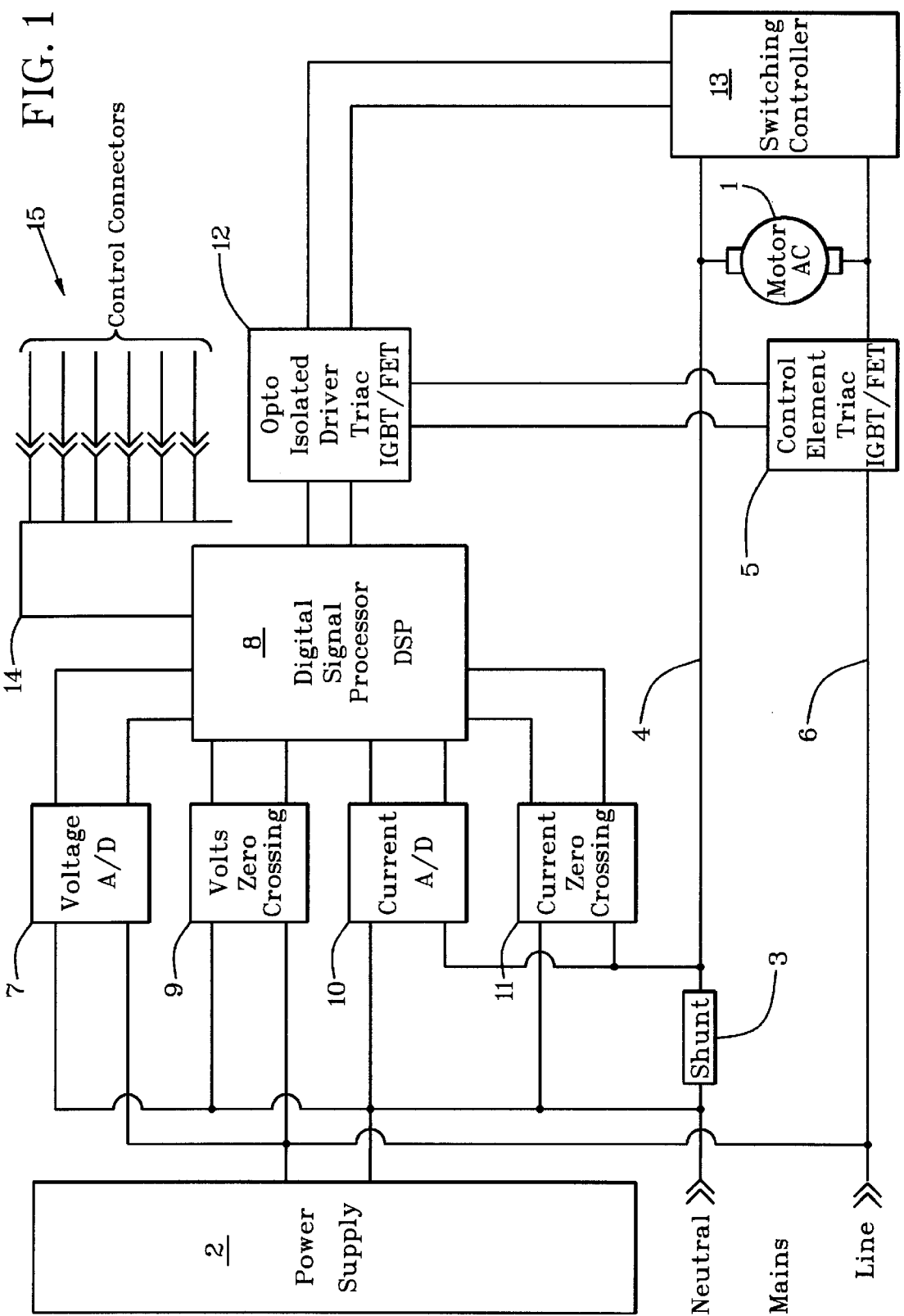
FIG. 1 is a block diagram of the efficiency-maximization motor controller.

Listed numerically below with reference to the drawings are terms used to describe features of this invention. These terms and numbers assigned to them designate the same features throughout this description.
1. Induction motor
2. Power supply
2A. single phase power supply
2B. additional two phase power supply
3. Shunt resistor
4. Mains neutral
5. Control element
6. Mains line
7. Voltage A/D converter
8. DSP
9. Volts zero-crossing detector
10. Current A/D converter
11. Current zero-crossing detector
12. Opto isolated driver
13. Switching controller
14. Control attachment
15. Control connectors
16. U1B unity gain follower
17. Alternator network
18. Capacitor C2
19. Resistors
20. U1D op-amp
21. Capacitors
22. U1C amplifier
23. U2B comparator
24. Zero crossing detector
25. U1A
26. R3
27. R6
28. Rail splitter
29. C19
30. Triac controller
31. Opto 1
32. Triac Q7
33. Resistor R125
34. Capacitor C80
35. IGBT controller
36. First opto isolator U25
37. Second opto isolator U26
38. U8A
39. U8B
40. IGBT device Q8
41. IGBT device Q9
42. U23
43. U24
44. D48
45. U9
46. Bead inductor L2
47. voltage transformer
48. current transformer Reference is made first to FIG. 1. Electrical power for an induction motor 1 from a main power supply 2 is applied through a shunt resistor 3 in a mains neutral 4 line and through a predetermined control element 5 in a mains line 6 in electrical communication with the power supply 2. The predetermined control element 5 can be selected from a class of control elements that include a triac, a field-effect transistor (FET), an insulated gate bipolar transistor (IGBT) device, an SCR, and a 3 quadrant triac.

A voltage analog-to-digital (A/D) converter 7 is in electrical communication intermediate the power supply 2 and a digital signal processor (DSP) 8 with mains voltage being applied to the voltage A/D converter 7. Output of the voltage A/D converter 7 is applied to the DSP 8 for voltage measurement.

A volts zero-crossing detector 9 is in electrical communication intermediate the power supply 2 and the digital signal processor (DSP) 8 with mains voltage being applied to the volts zero-crossing detector 9. Output of the volts zero-crossing detector 9 is applied to the DSP 8 for phase-angle measurement of volts.

A current A/D converter 10 is in electrical communication intermediate the power supply 2 and the digital signal processor (DSP) 8 with current to drive the induction motor 1 being monitored by the shunt resistor 3 and with the current being applied to the current A/D converter 10 through the shunt resistor 3. Output of the current A/D converter 10 is applied to the DSP 8 for current measurement.

A current zero-crossing detector 11 is in electrical communication intermediate the power supply 2 and the digital signal processor (DSP) 8 with the current being applied to the current zero-crossing detector 11 through the shunt resistor 3. Output of the current zero-crossing detector 11 is applied to the DSP 8 for time and phase-angle measurements of current relative to voltage.

The DSP 8 is a micro-controller having architecture to compute predetermined parameters of the induction motor 1 selectively and for controlling current for the induction motor 1 in response to the predetermined parameters.

An optoelectronically (opto) isolated driver 12 is in electrical communication intermediate the DSP 8 and the control element 5.

A switching controller 13 is in electrical communication intermediate the opto isolated driver 12 and the control element 5.

A control attachment 14 is in control communication intermediate the DSP and a class of control connectors 15 or connector ports that include serial connectors RS232, serial connectors RS485, Control Area Network (CAN), ethernet, Universal Serial Bus (USB), TCPIP, MODBUS, MODBUS+, wireless, fiber optics, custom utility connectors, and a manual control switch for motor-current-optimization selectively.

The predetermined parameters of the induction motor 1 that the DSP 8 has computer architecture to compute for controlling current for the induction motor 1 include (a) energy savings resulting from predeterminedly selected motor uses; (b) motor soft-start requirements for current to prevent its predeterminedly fast starting; (c) motor stop requirements for current to prevent its predeterminedly fast stopping; (d) motor random-start requirements for current to provide optimum current for its predeterminedly random starting; (e) motor remote-start requirements for current to provide optimum current for its predeterminedly remote starting; (f) motor intranet and internet networking requirements for current to provide optimum current for its predetermined intranet and internet networking; (g) comprehensive monitoring of a selection of the induction motor's 1 electrical parameters that include harmonic content, RMS current, power output, watts consumed, VARs, cycle frequency, phase angle, firing angle, PWM, zero-crossing point, and power being saved by predetermined application of the efficiency-maximization motor controller; (h) automatic logging of usage and downtime of the induction motor; (i) a running total of energy savings from predetermined use of the efficiency-maximization motor controller; and (j) monitoring the induction motor 1 against overload, stalling, loss of phase, over-voltage, under voltage, overcurrent, under-current, detrimental temperature, low RPM and DC offset.

Figures 2, 3, 4:
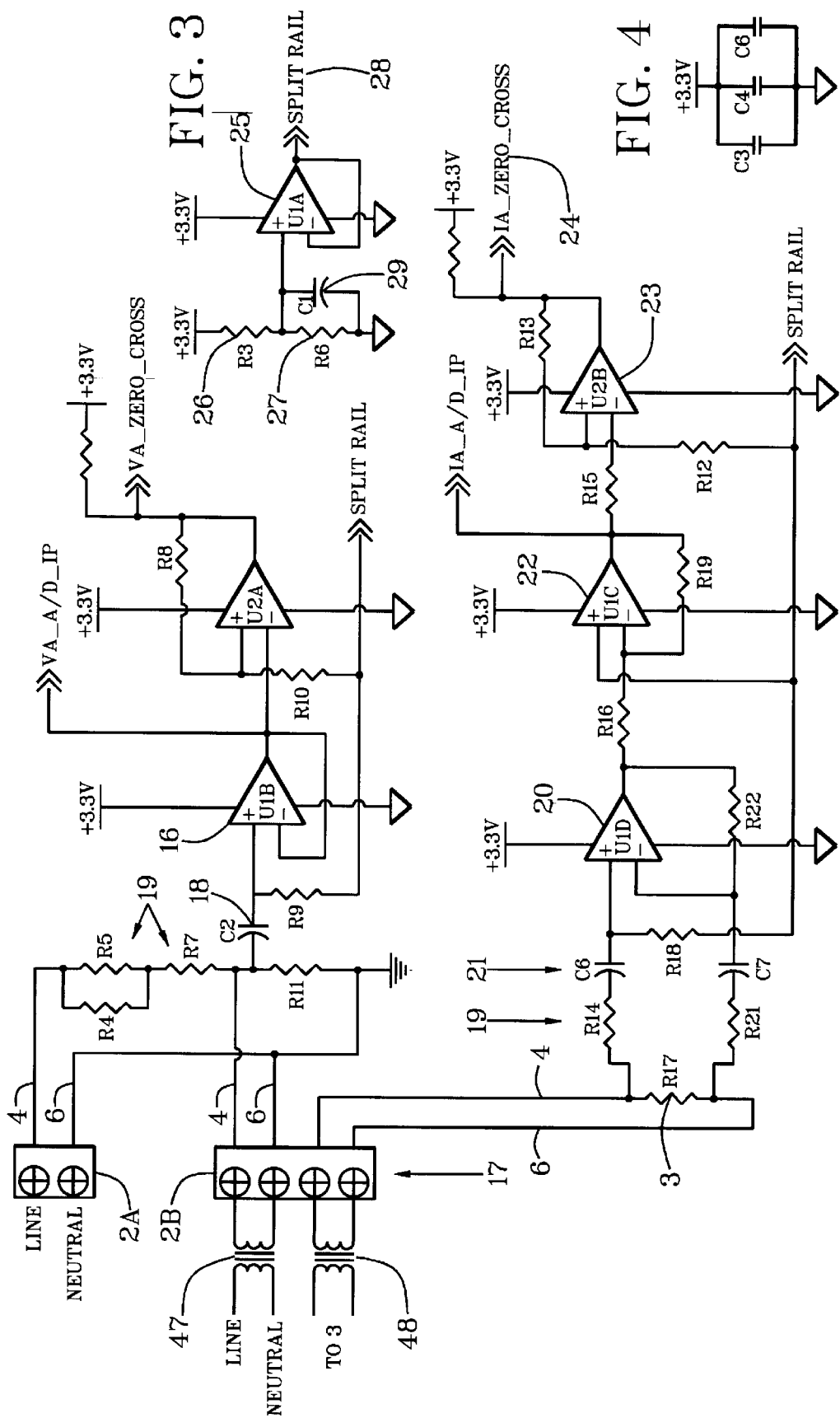
FIG. 2 is an electrical diagram of an analog signal conditioner phase "A"
FIG. 3 is an electrical diagram of a second amplifier stage for the FIG. 2 signal conditioner.
FIG. 4 is an electrical diagram of a second capacitor for the FIG. 2 ground virtual circuit.
Figure 9:
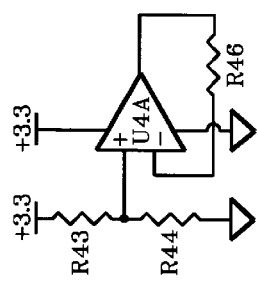
FIG. 9 is an electrical diagram of a second amplifier stage for the FIG. 8 signal conditioner.
Figure 10:
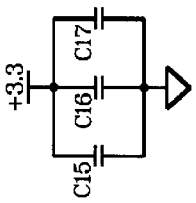
FIG. 10 is an electrical diagram of a second capacitor for the FIG. 2 signal conditioner.

Referring to FIG. 2, when configured for single phase, and to reduce costs, a potential divider, connected to power supply 2A as shown is used to reduce the 120/240 volts to about 1 volt RMS for voltage measurement. The potential divides comprise the resistor group 19, R5+R7 with R4 as a trim, together with R11, which provides the division. The divided voltage is applied through C2 18 for DC offset isolation to the unity gain follower U1B 16. The output of U1B 16 symmetrical around the split+3.3V is applied to the DSP for voltage measurement. The same signal is applied to U2A which is a comparator with a threshold at the split rail potential (zero volts for the AC voltage present there). R8 and R10 provide Hysteresis by applying a small amount of positive feedback.

Likewise, the current input uses a shunt resistor R17 3 to reduce costs. The shunt is differentially connected to U1D 20 via C6 & C7 for DC isolation to the unity gain differential stage. The output of U1D 20 is connected to the inverting amplifier U1C 22 whose gain can be altered by selection of R16 to match the shunt to different power rated models. The output of U1C 22 is applied to the DSP for current measurement. The same signal is applied to U2B 23 which is a comparator with a threshold at the split rail potential (zero volts for the AC current, represented as a voltage present there). R13 and R12 provide Hysteresis by applying a small amount of positive feedback.

Figure 8:
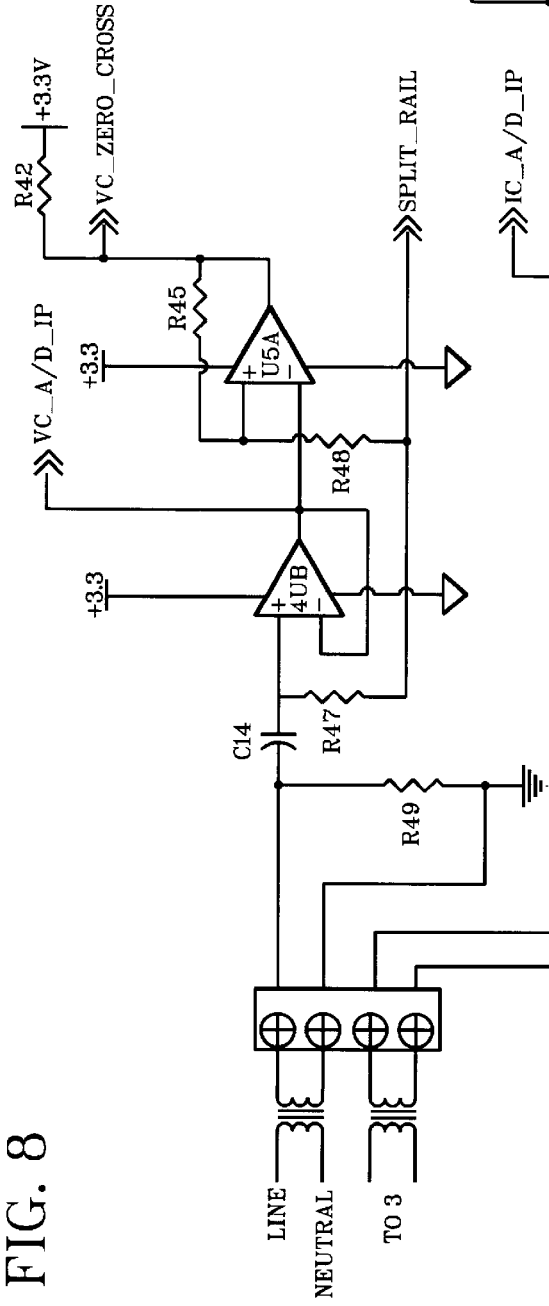
FIG. 8 is an electrical diagram of an analog signal conditioner phase "C"
Figure 11B:
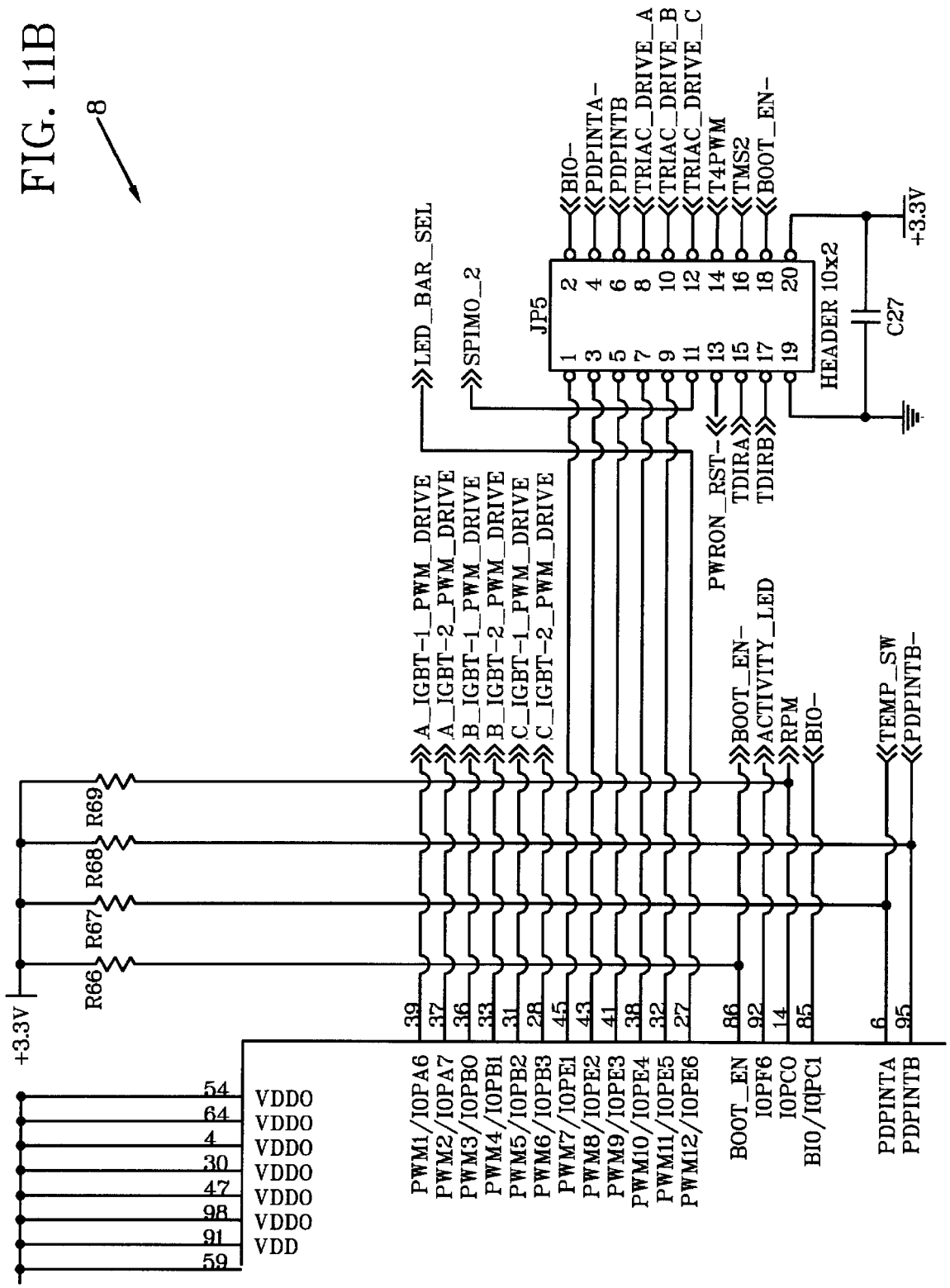
FIG. 11B is an un-shrunk diagram of a top-right portion of the FIG. 11 shrunk diagram.
Figure 11C:
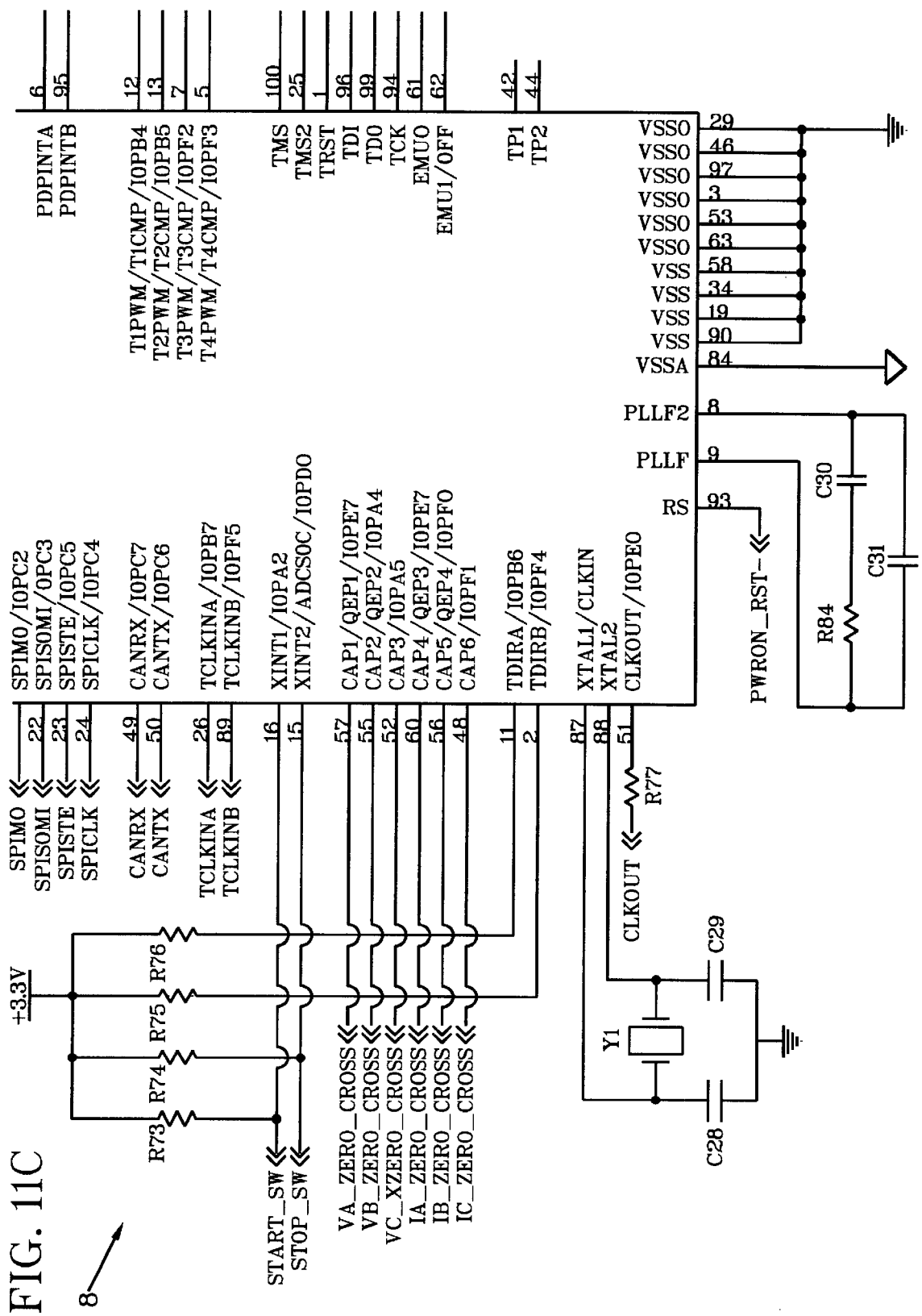
FIG. 11C is an un-shrunk diagram of a bottom-left portion of the FIG. 11 shrunk diagram.
Figures 11D, 12, 13:
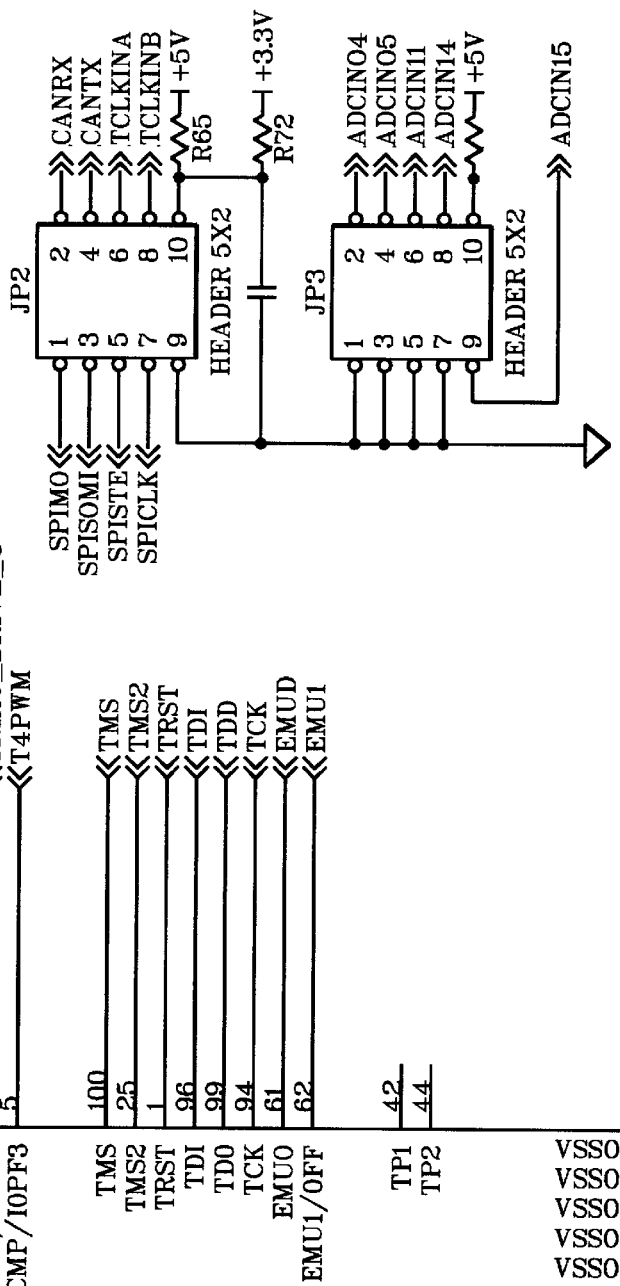
FIG. 11D is an un-shrunk diagram of a bottom-right portion of the FIG. 11 shrunk diagram.
FIG. 12 is an electrical diagram of a double header assembly for the DSP.
FIG. 13 is an electrical diagram of a single header assembly for the DSP.
Figure 14:
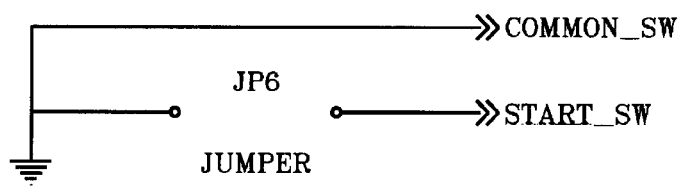
FIG. 14 is an electrical diagram of a jumper assembly for the DSP.
Figure 15:
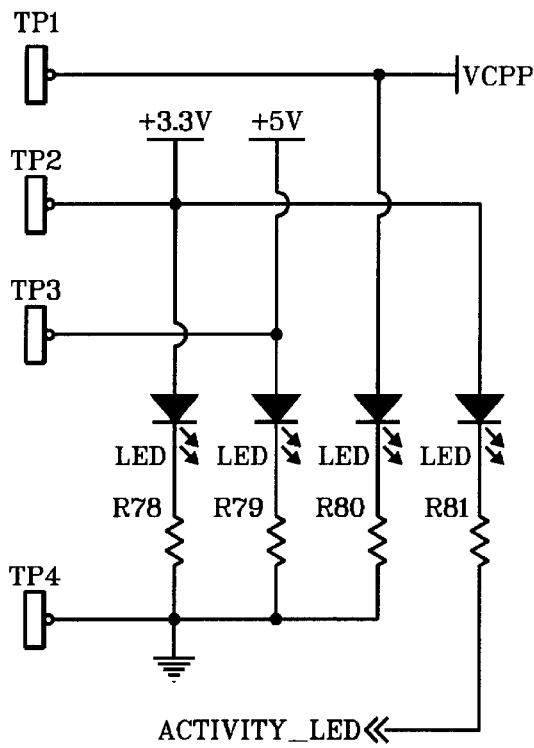
FIG. 15 is an electrical diagram of an activity indicator for an activity LED for the DSP.
Figure 16:
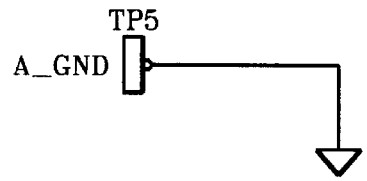
FIG. 16 is an electrical diagram of a ground for the DSP.
Figure 17:
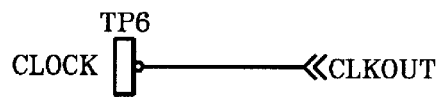
FIG. 17 is an electrical diagram of a time clock-out switch for the DSP.
Figure 18:
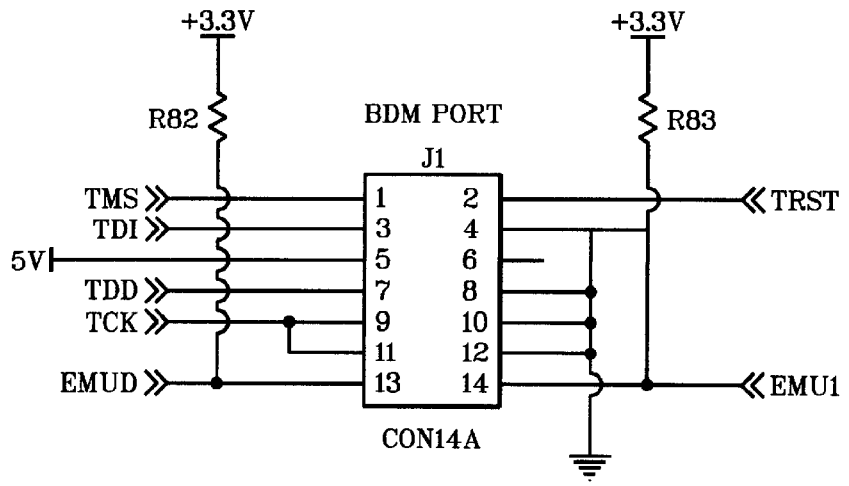
FIG. 18 is an electrical diagram of a communications port for the debugger and programing port.
Figure 19:
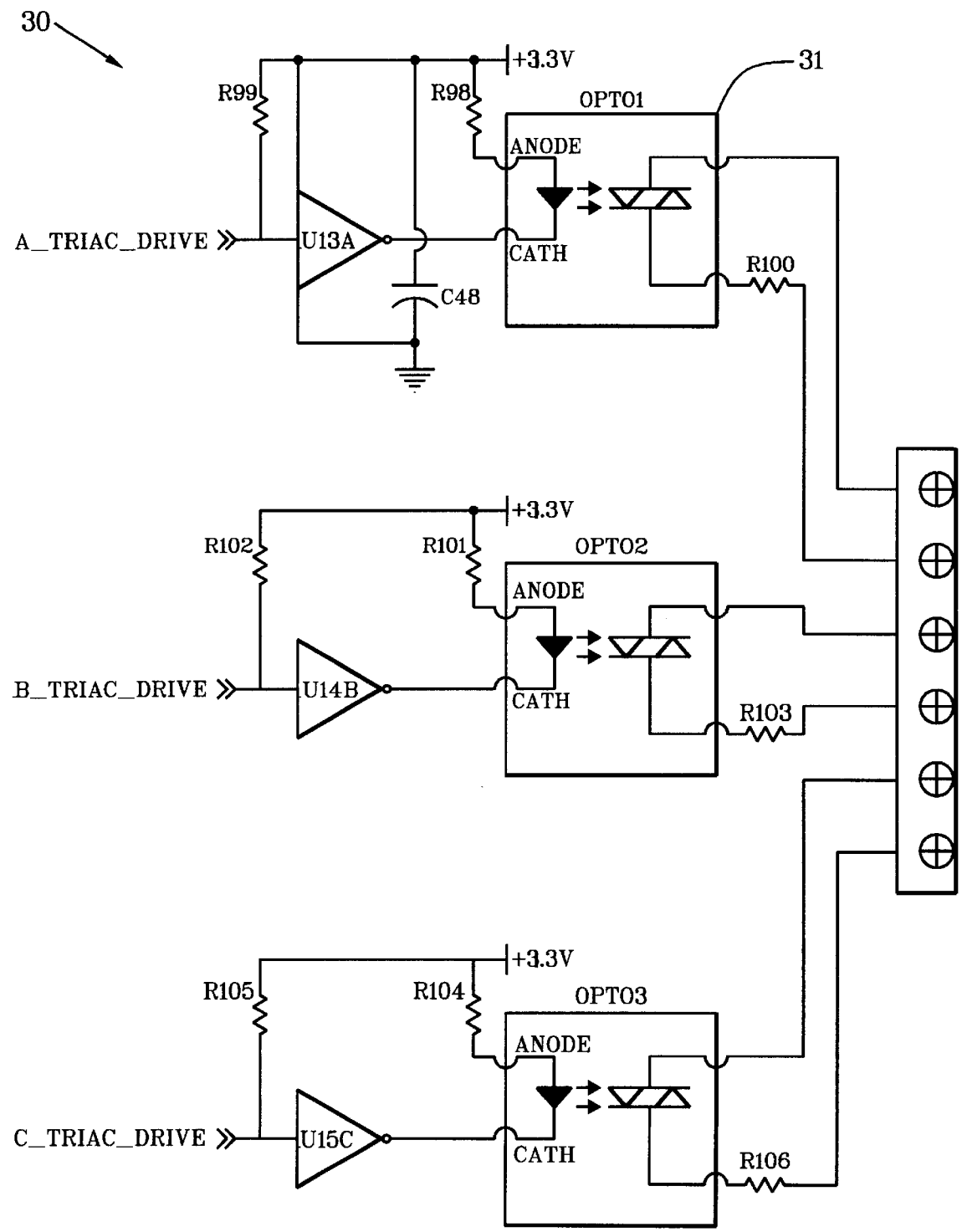
FIG. 19 is an electrical diagram of a triac three-phase driver for a motor triac.

When configured for three phase power with additional two phase power supply input 2B all inputs need to be isolated. Voltage and current transformers are used instead of the resistive potential divider network used with one phase power supply 2A as described previously. A voltage transformer 47 is connected to the circuitry via power supply 2B, R11 serves as the load on the transformer, and the transformer ratio together with R11 presents the correct voltage level through C2 18 to U1B 16. Similar circuitry is used for the other two phases as shown in FIGS. 5 and 8. Similarly for three phase three current transformers are used together with a "burden resistor" in place of the shunt. A current transformer is connected to power supply 2B with the primary in series with each motor phase. In single phase the shunt is in series with the motor neutral for current measurement, impossible in three phase without isolated A/D converters or Isolation amplifiers, the transformers are much less expensive. Monitoring the split rail voltage and also the 3.3 volt rail in the DSP removes completely any inaccuracies associated with the divider chain to U1A 25, the rail splitter.

The U1D op-amp 20 is in electrical communication with a U1C amplifier 22 and a U2B collector 23 with output to communicate current zero crossing 24 which is shown as IA ZERO CROSS, to the DSP 8 which is shown in FIGS. 1 and 11–18.

AC current is read as a voltage across the series motor shunt resistor 3 that is shown as R17. This is done by use of the differentially connected op-amp U1D 20 in a classic configuration to avoid any "ground loop" conditions created by common impedance coupling. Connection to the shunt resistor 3 is accomplished in a Kelvin configuration where separate monitoring connections are made to the shunt resistor 3 as shown. Differential signals are passed to the op-amp U1D 20 via R14, R21, R18 and R21. Two capacitors, C6 and C7, are used to isolate the DC component on op-amp inputs. The differential U1D op-amp 20, together with the second U1C amplifier 22 stage, has sufficient gain to raise the small voltage derived from the shunt resistor 3 to a level appropriate for accurate analog-to-digital conversion within a range consistent with the induction motor 1 requirements.

This signal is taken from the output of the second-stage amplifier. Simultaneously, this buffered output is applied to U2B comparator 23 which senses the zero-crossing point 24 accurately. Hysteresis is used to speed up the edge of the current zero-crossing detector 24 to further enhance accuracy. The output is taken from the open collector output of the U2B comparator 23 and passed to a zero-cross input of the DSP 8.

DC isolation is required at both the voltage and current inputs with use of single-supply op-amps and comparators. In order to enable bi-polar signals to pass, the operating point is offset to half of the supply voltage in a "virtual ground" circuit. This topology is achieved by use of U1A 25 which has R3 26 and R6 27 arranged as a rail splitter, split rail 28, and decoupled by C1 29.

This arrangement gives the virtual ground or split rail extremely low impedance which is at the same AC potential as the analog ground.

Referring to FIGS. 1 and 11–18, the DSP 8 is used to process data rapidly for virtually every aspect of the efficiency-maximization motor controller. It runs at thirty MHz and is capable of performing thirty million instructions per second (30 MIPS). Independently, it handles all of the A/D conversions, PWM generation and the timing necessary to make determinations of the period between zero-crossing points. This processor performs all calculations within each and every half cycle period of 8.33 milli-seconds. Simultaneously, the DSP 8 monitors temperature of the motor, reads start/stop switches, monitors all supply voltages, performs all communications, and outputs appropriate drive signals to the TRIAC or the IGBT/MOS-FET, monitors RPM and temperature. Further, the DSP 8 supports "in-system programming" background de-bugging, and an activity LED.

Figure 20:
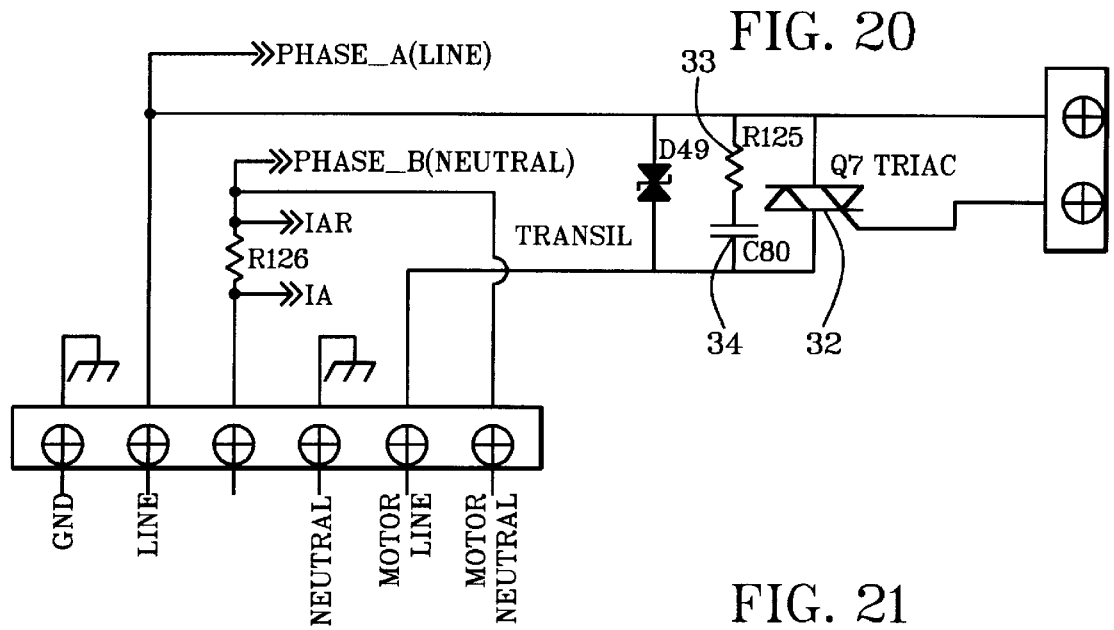
FIGS. 20–24 are electrical diagrams of power-connection elements for a single-phase triac.
Figure 21:
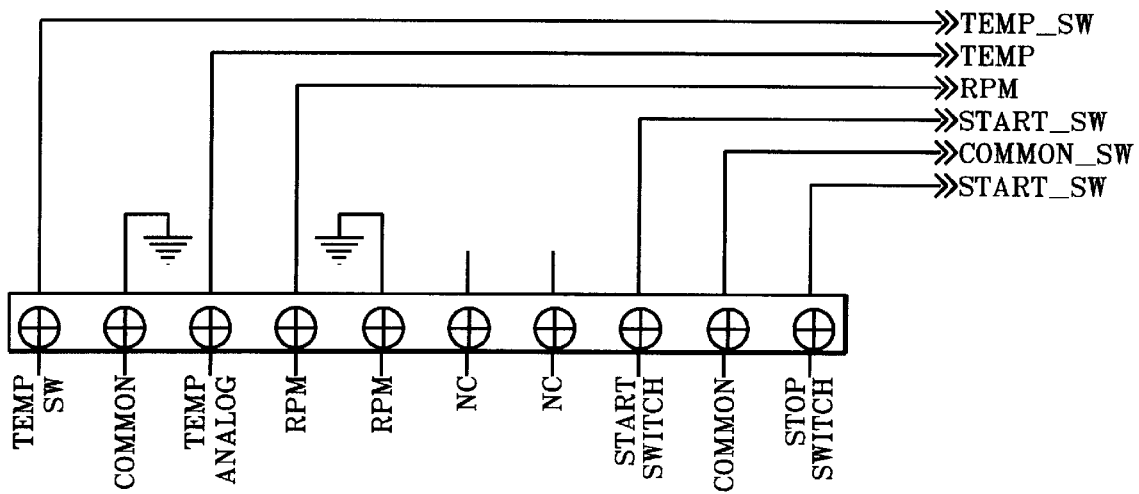
Figures 22, 23:
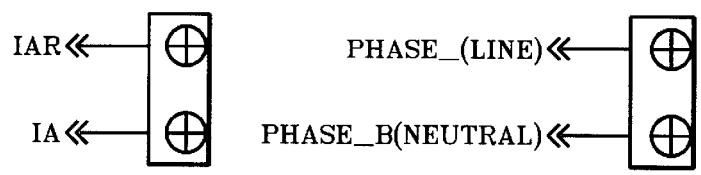
Figure 24:
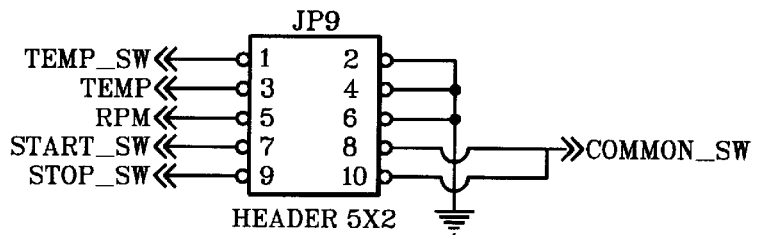

Referring to FIGS. 19–24, triac controller 30 has an opto-isolated driver, opto1 31, which is an opto-triac that is driven by a Schmitt inverter U13A. Triac drive, inverted from the DSP 8, shown in FIGS. 1 and 11–18, turns on the LED of the opto1 31 which, in turn, switches on the internal photo-sensitive triac controller 30 which turns on a main triac Q7 32 as shown in FIG. 20. Resistor R125 33 and capacitor C80 34 form a snubber network and a transorb device D49 absorbs and clamps any transients to a magnitude which is harmless to the triac Q7 32.

Figure 25:
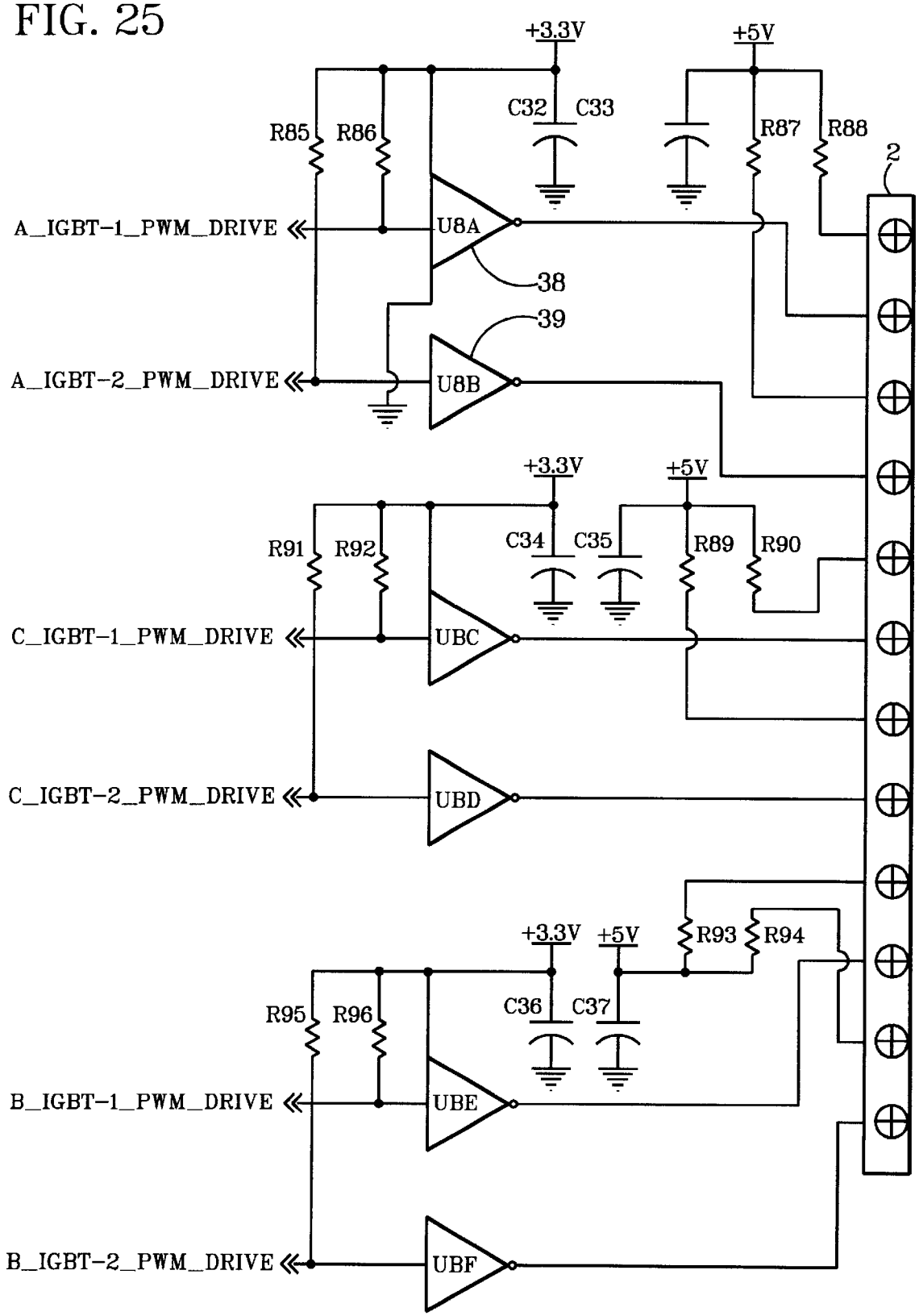
FIG. 25 is an electrical diagram of an IGBT three-phase driver.
Figure 26:
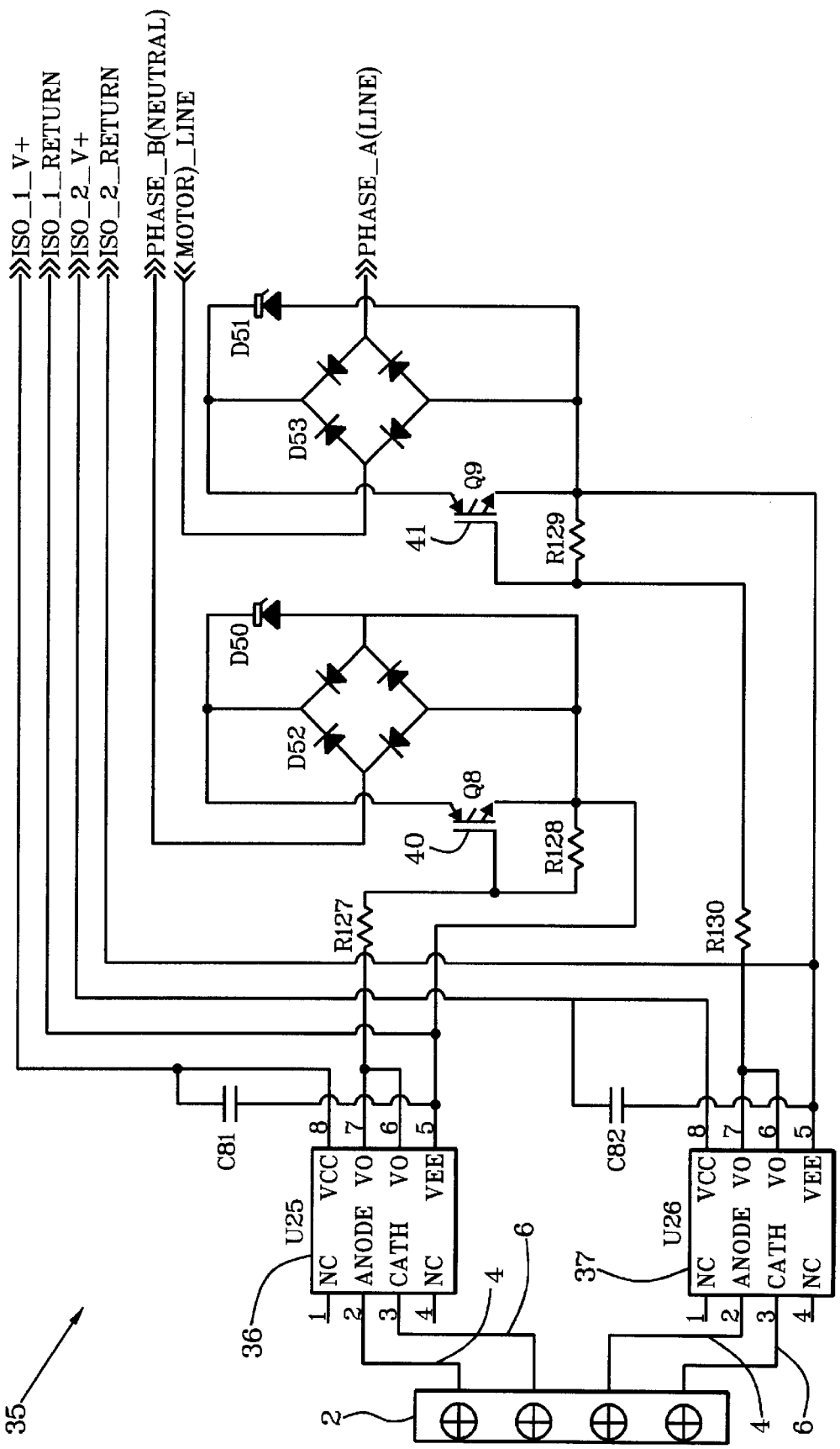
FIG. 26 is an electrical diagram of an IGBT single-phase connection.

Referring to FIGS. 25–26, an IGBT controller 35 has a first opto isolator U25 36 and a second opto isolator U26 37 that are driven by U8A 38 and U8B 39, which in turn drive IGBT device Q8 40 and IGTB device Q9 41. Each device is controlled independently by the DSP 8, allowing full control of firing angle. Unlike the triac, this gives full control over the reactive portion of the current Q9 which reduces substantially to the problems associated with power factor (PF). Unlike the triac which stays on until current has ceased to flow, the IGBT controller 35 can be turned on or off at will. Since the IGBT controller's 35 on cycle is PWM modulated, complete control of rise time, amplitude, and duration are available. This provides much improvement of RFI/EMG, harmonic content and reactive power factor (PF) for part-power operation.

Figure 27:
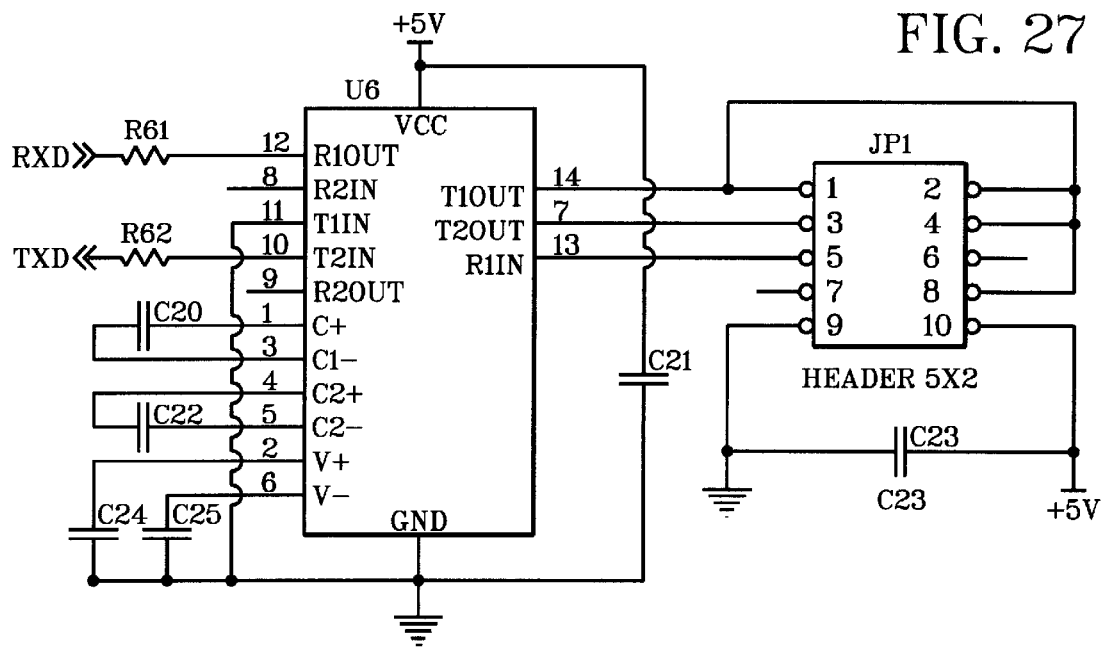
FIGS. 27–28 are electrical diagrams of communications connections to the outside world for use on personal computers.
Figure 28:
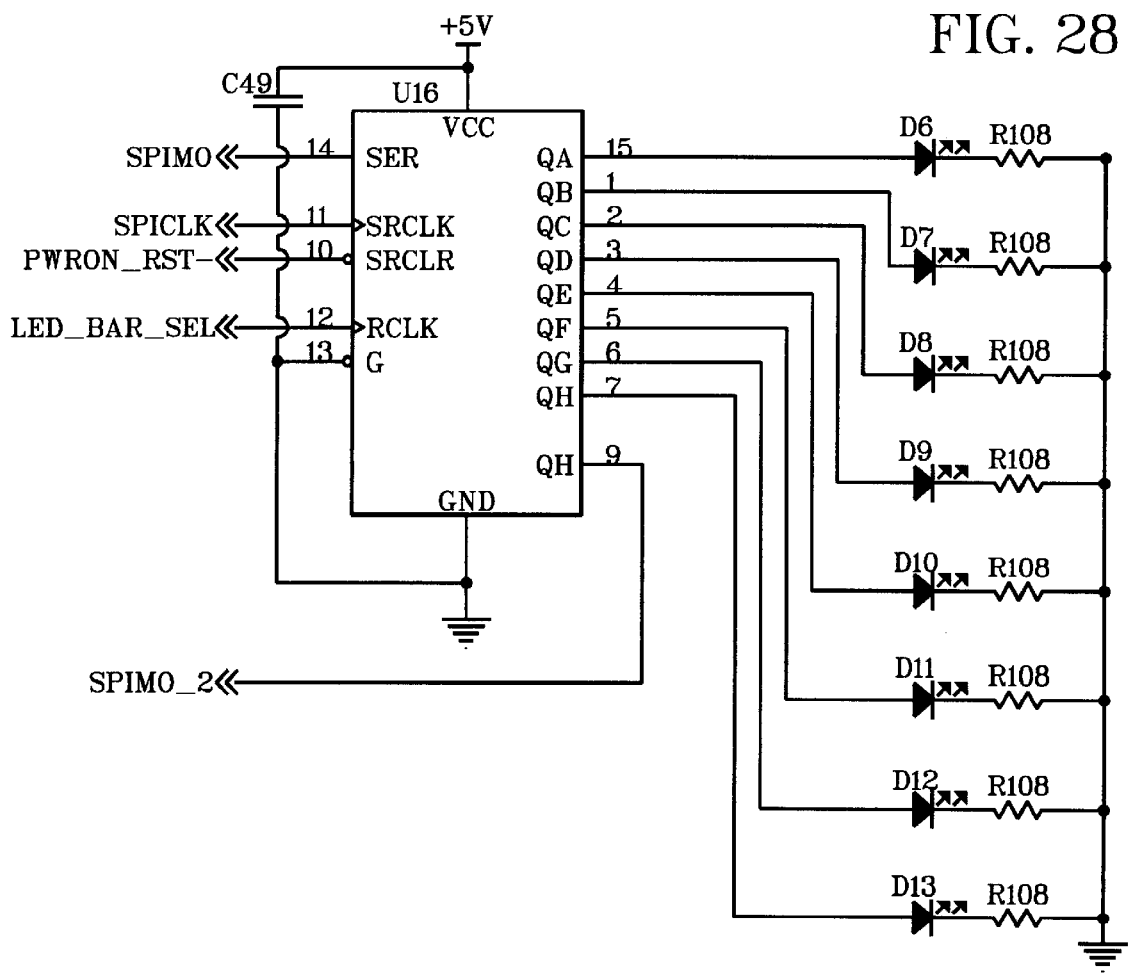
Figure 29:
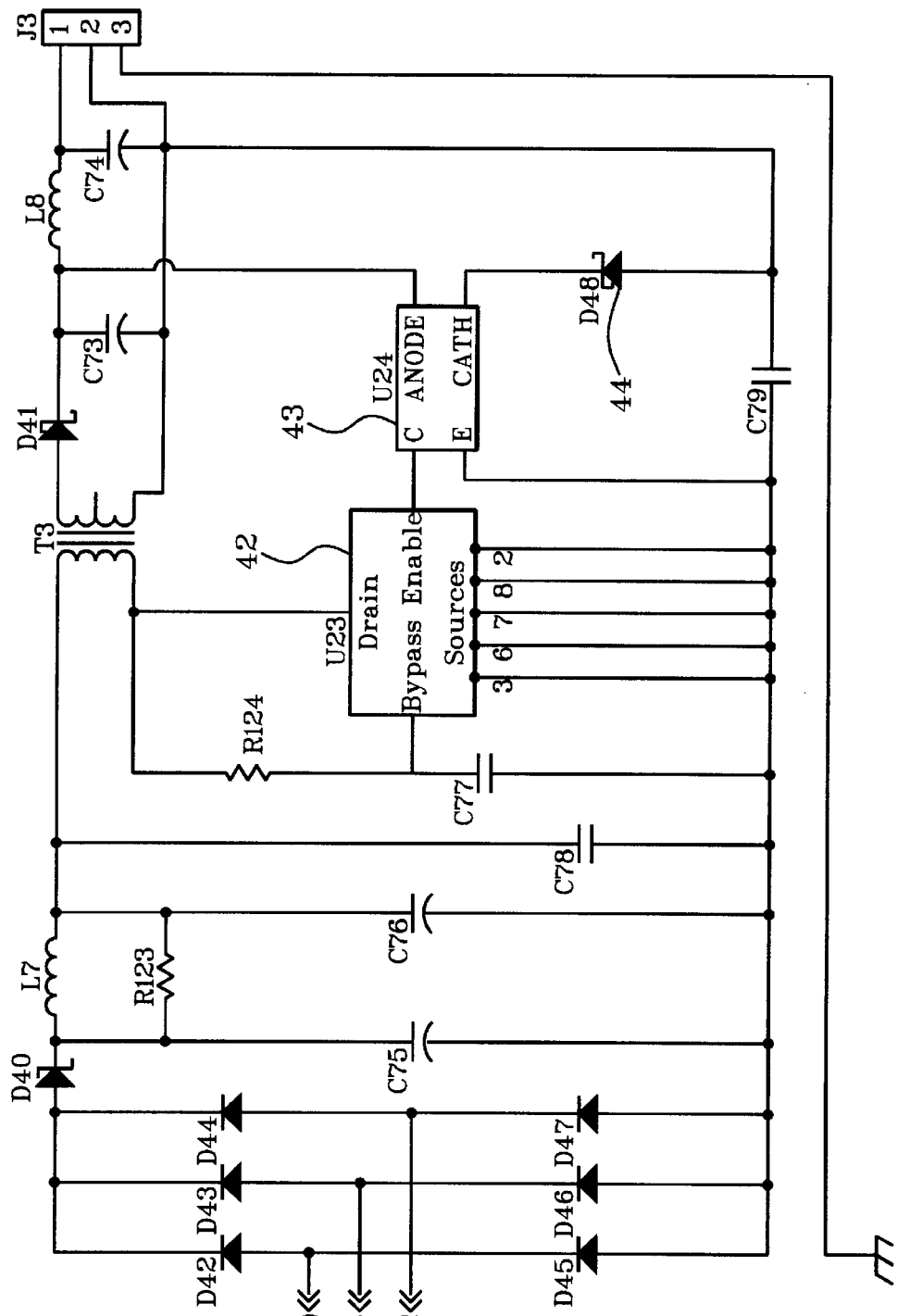
FIG. 29 is an electrical diagram of a main PSU.
Figure 30:
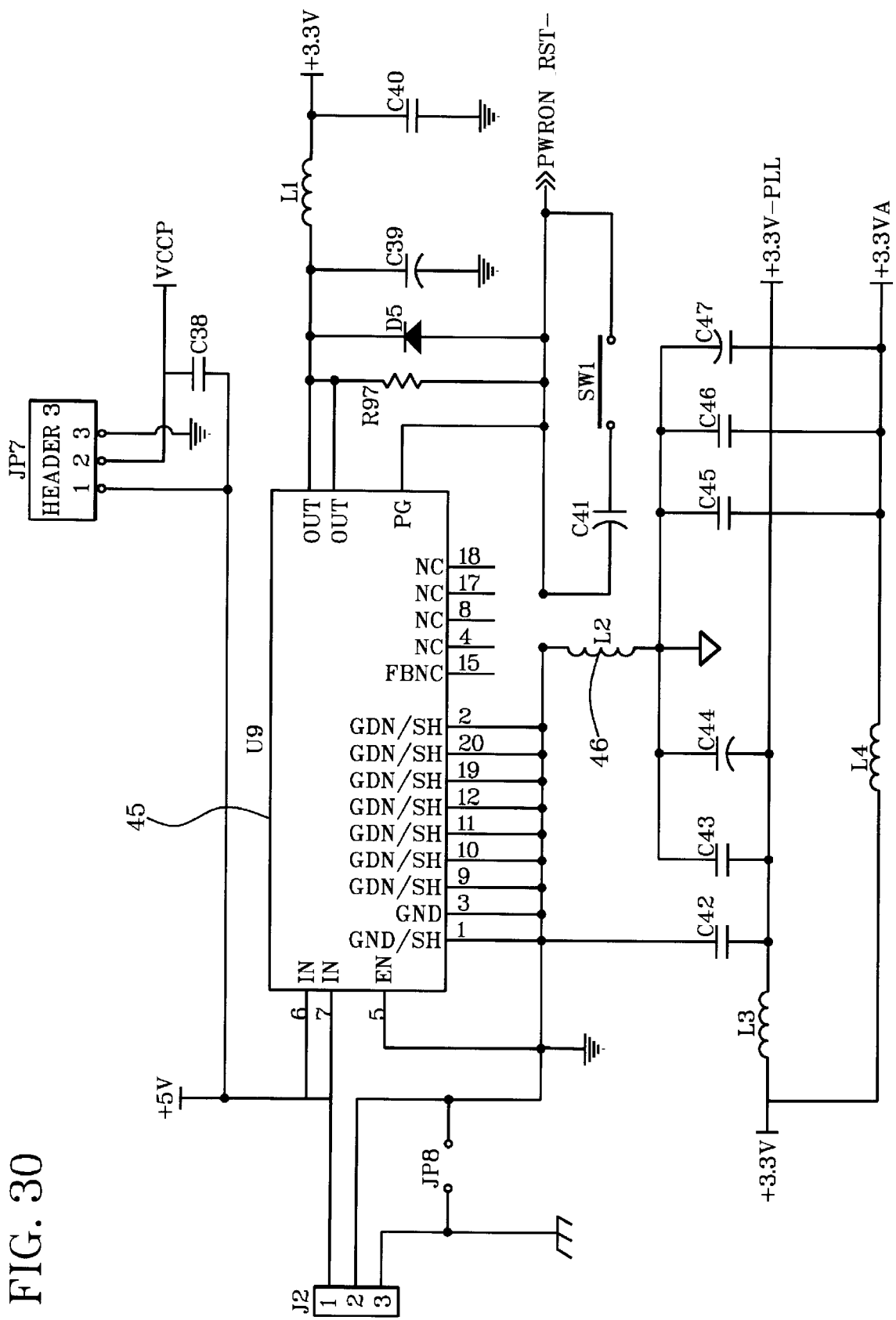
FIG. 30 is an electrical diagram of a power conditioner.
Figure 31:
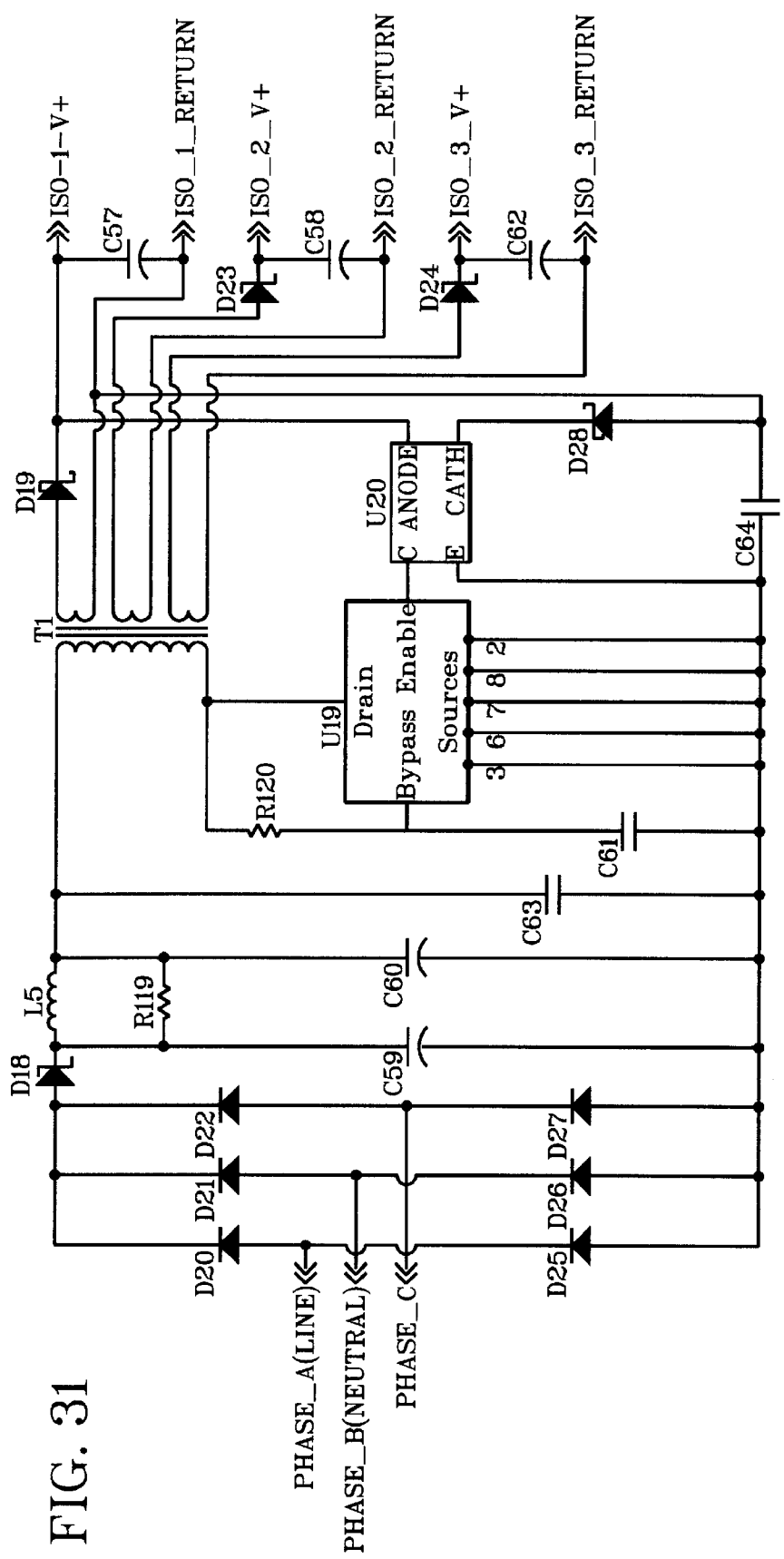
FIGS. 31–32 are electrical diagrams of an ISO-PSU.
Figure 32:
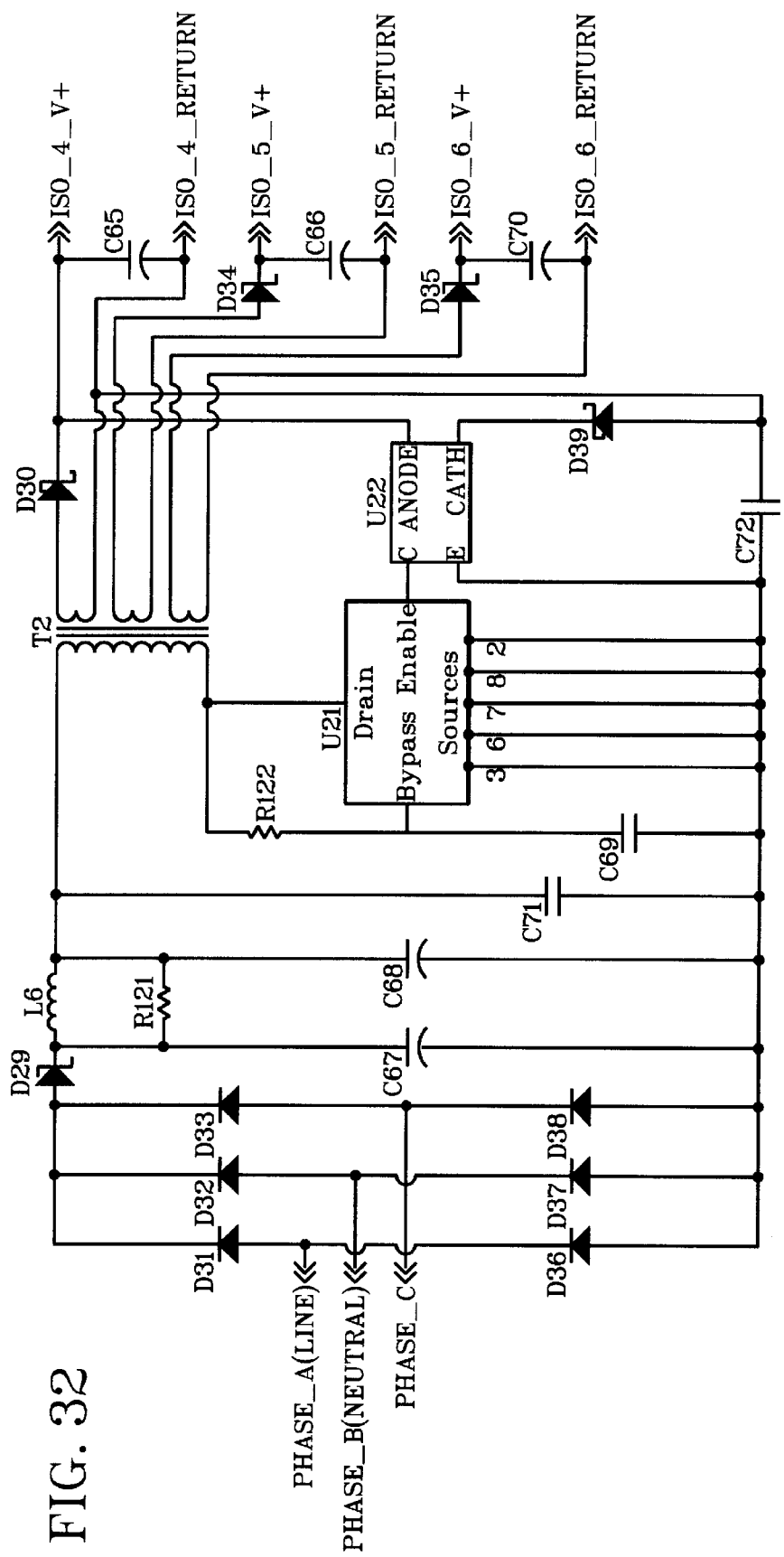
Figure 33:
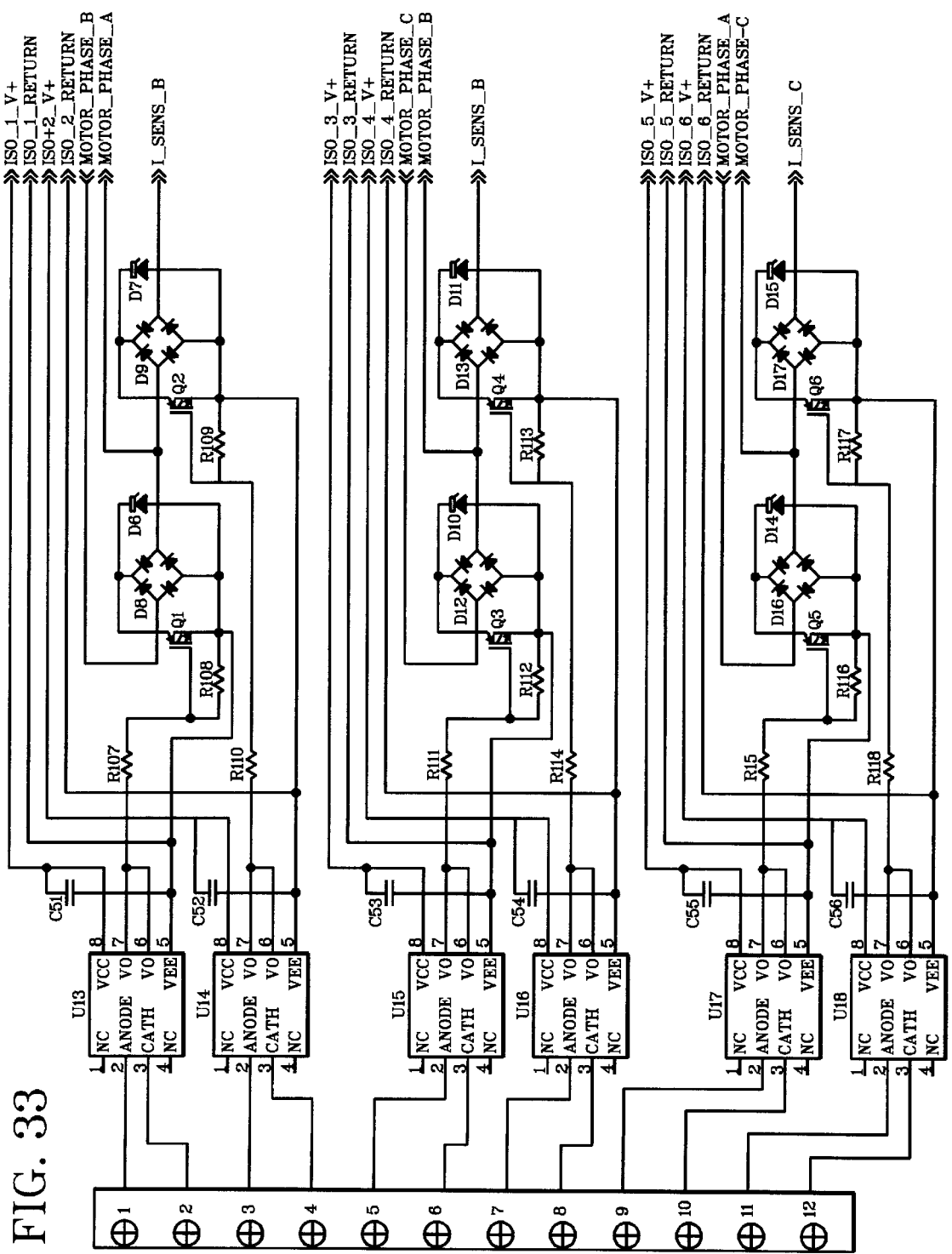
FIG. 33 is an electrical diagram of three-phase IGBT power module.
Figure 34:
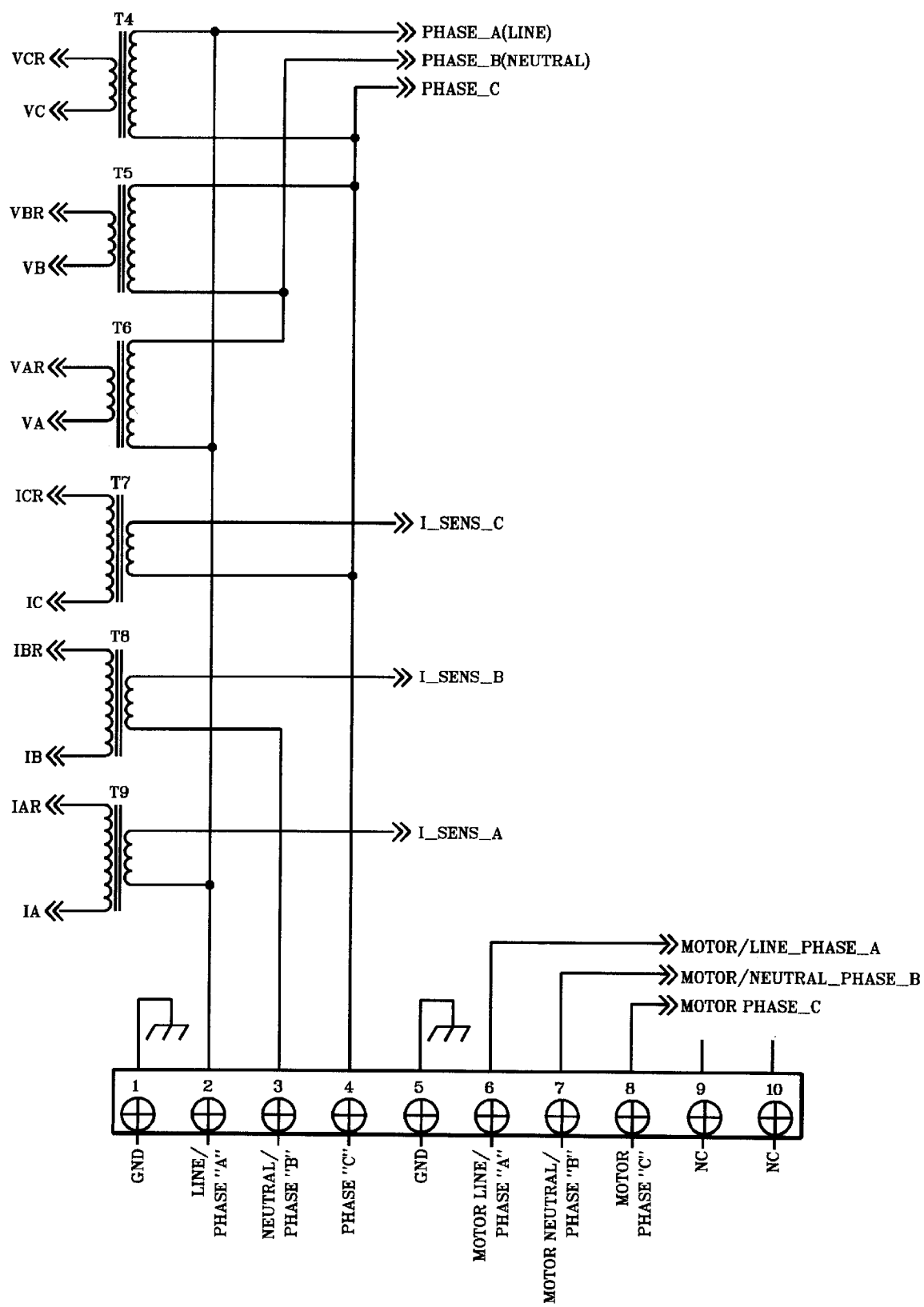
FIG. 34 is an electrical diagram of three-phase IGBT power connection.
Figure 35:
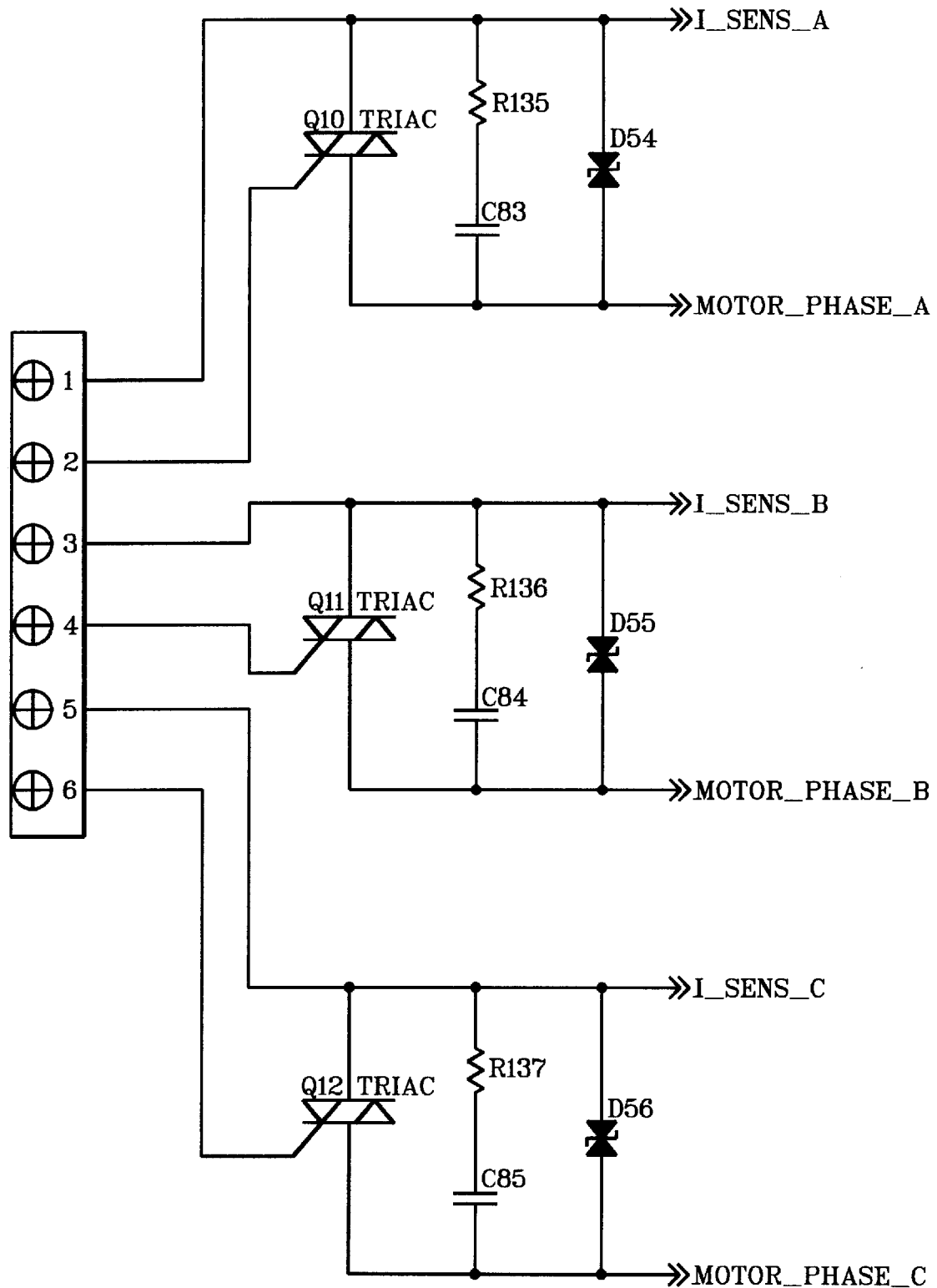
FIG. 35 is an electrical diagram of three-phase triac power module.

Referring to FIGS. 27–28, a communications example is shown for a simple RS232 serial port which can be connected to a computer to display all monitor and control functions. Similarly the DSP 8 can support a plurality of control connectors that include but are not limited to (a) Serial Communications RS232; (b) Serial Communications RS845; (c) CAN (Control Area Network); (d) Ethernet; (e) USB (Universal Serial Bus); (f) TCPIP (stack for internet and intranet communications); (g) Modbus; and (h) Modbus+.

Referring to FIGS. 29–32, for power supply units, main +5V power is provided by an "off-line" switching regulator. The +5V is accurately maintained by a feedback loop comprising U23 42, U24 43 and reference D48 44. U24 43 is an opto isolator. U9 45 is a linear low-drop-out regulator which provides +3.3V for the DSP 8 and other active circuitry. Various +3.3V feeds are derived from the main feed, each of which includes LC filtering as appropriate for needs on the circuit blocks. A bead inductor L2 46 provides isolation of digital noise from the analog ground system. When IGBT devices are employed, two additional, small, isolated supplies are required. These are similar to the off-line regulator, except that three +18V are produced. In the case of the single-phase embodiment with IGBT Mosfets, only two outputs are required. When triacs are employed, no isolated voltages are required.

A use method for optimization of electrical current supplied to the induction motor 1 has the following steps. For the efficiency-maximization motor controller, a no-load phase angle of lag of voltage by current is predetermined for rotating the induction motor 1 at a predetermined operational speed of rotation without motor-load resistance in excess of the motor-load resistance inherent to the induction motor 1 separately from and independently of motor loading that is applied to an output shaft of the induction motor 1 for output work. Current required for rotating the induction motor 1 under a predetermined full load and having a predetermined full-load phase angle of lag of voltage by current for rotating the induction motor 1 maximumly loaded at the predetermined operational speed is predetermined.

With the efficiency-maximization motor controller is calculated any part-load phase angle of the lag of voltage by current for rotating the induction motor 1 at the predetermined operational speed of rotation with any added motor-load resistance from any part-loading that is applied to the induction motor 1. Calculated also with the efficiency-maximization motor controller is any part-load increase of current required for any part-loading of the induction motor 1 as a part-load percent of a difference between the no-load phase angle and the full-load phase angle.

Then with the efficiency-maximization motor controller, the part-load increase of current required is directed to the induction motor 1 from the power supply 2.

Using the efficiency-maximization motor controller as described, with the DSP 8 having computer architecture to compute for the system's predetermined parameters of the induction motor 1, and with a control attachment 14 that is in control communication intermediate the DSP 8 and a predetermined class of control connectors 15 as diagramed in FIG. 1, at least one of the electrical parameters is entered into the efficiency-maximization motor controller for an objective of operation of the induction motor 1 through a selected control connector 15.

A new and useful efficiency-maximization motor controller and method having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. An efficiency-maximizing motor controller comprising:

an induction-motor power conveyance with which mains voltage from a power supply is in electrical communication for power to be applied to the induction motor through a shunt resistor in a mains neutral line and a predetermined control element in a mains line in electrical communication with the power supply;

a voltage analog-to-digital (A/D) converter in electrical communication intermediate the power supply and a digital signal processor (DSP);

mains voltage being in electrical communication to be applied to the voltage A/D converter;

output of the voltage A/D converter being in electrical communication to be applied to the DSP for voltage measurement;

a volts zero-crossing detector in electrical communication intermediate the power supply and the DSP;

mains voltage being in electrical communication to be applied to the volts zero-crossing detector;

output of the volts zero-crossing detector being in electrical communication to be applied to the DSP for time and phase-angle measurements of volts;

a current A/D converter in electrical communication intermediate the power supply and the DSP;

current to drive the induction motor being in electrical communication to be monitored by the shunt resistor;

the current being in electrical communication to be applied to the current A/D converter through the shunt resistor;

output of the current A/D converter being in electrical communication to be applied to the DSP for current measurement;

a current zero-crossing detector in electrical communication intermediate the power supply and the DSP;

mains current being in electrical communication to be applied to the current zero-crossing detector through the shunt resistor;

output of the current zero-crossing detector being in electrical communication to be applied to the DSP for time and phase-angle measurements of current;

the DSP having computer architecture to compute predetermined parameters of the induction motor selectively;

the DSP being a micro-controller for controlling current for the induction motor in predetermined response to the predetermined parameters of the induction motor;

an optoelectronically (opto) isolated driver in electrical communication intermediate the DSP and the control element; and a switching controller in electrical communication intermediate the opto isolated driver and the control element.

2. The efficiency-maximization motor controller of claim 1 and further comprising:

a control attachment in control communication intermediate the DSP and a class of control connectors that includes serial connectors RS232, serial connectors RS485, Control Area Network (CAN), ethernet, Universal Serial Bus (USB), TCPIP, MODBUS, MODBUS+, wireless, fiber optics, custom utility communications, and a manual control switch for motor-current-optimization selectively.

3. The efficiency-maximization motor controller of claim 1 wherein:
the predetermined parameters of the induction motor that the DSP has computer architecture to compute for controlling current for the induction motor include energy savings resulting from predeterminedly selected uses of the efficiency-maximization motor controller.

4. The efficiency-maximization motor controller of claim 1 wherein:
the predetermined parameters of the induction motor that the DSP has computer architecture to compute for controlling current for the induction motor include the induction motor's soft-start requirement for current to prevent its predeterminedly fast starting.

5. The efficiency-maximization motor controller of claim 1 wherein:
the predetermined parameters of the induction motor that the DSP has computer architecture to compute for controlling current for the induction motor include the induction motor's soft-stop requirement for current to prevent its predeterminedly fast stopping.

6. The efficiency-maximization motor controller of claim 1 wherein:
the predetermined parameters of the induction motor that the DSP has computer architecture to compute for controlling current for the induction motor include the induction motor's random-start requirement for current to provide optimum current for its predeterminedly random starting.

7. The efficiency-maximization motor controller of claim 1 wherein:
the predetermined parameters of the induction motor that the DSP has computer architecture to compute for controlling current for the induction motor include the induction motor's remote-start requirement for current to provide optimum current for its predeterminedly remote starting.

8. The efficiency-maximization motor controller of claim 1 wherein:
the predetermined parameters of the induction motor that the DSP has computer architecture to compute for controlling current for the induction motor include the induction motor's intranet and internet networking requirements for current to provide optimum current for its predetermined intranet and internet networking.

9. The efficiency-maximization motor controller of claim 1 wherein:
the predetermined parameters of the induction motor that the DSP has computer architecture to compute for controlling current for the induction motor include comprehensive monitoring of a selection of the induction motor's electrical parameters that include harmonic content, RMS volts, RMS current, power output, watts consumed, VARs, cycle frequency, phase angle, firing angle, PWM, zero-crossing point, and power being in electrical communication to be saved by predetermined application of the efficiency-maximization motor controller.

10. The efficiency-maximization motor controller of claim 1 wherein:
the predetermined parameters of the induction motor that the DSP has computer architecture to compute for controlling current for the induction motor include automatic logging of usage and downtime of the induction motor.

11. The efficiency-maximization motor controller of claim 1 wherein:
the predetermined parameters of the induction motor that the DSP has computer architecture to compute for controlling current for the induction motor include a running total of energy savings from predetermined use of the efficiency-maximization motor controller.

12. The efficiency-maximization motor controller of claim 1 wherein:
the predetermined parameters of the induction motor that the DSP has computer architecture to compute for controlling current for the induction motor include monitoring the induction motor predeterminedly for its comprehensive safeguard and protection of the induction motor against overload, stalling, loss of phase, over-voltage, under-voltage, over-current, under-current, detrimental temperature, low RPM, and DC offset.

13. The efficiency-maximization motor controller of claim 1 wherein:
the mains line and the mains neutral line are in electrical communication with a U1B op-amp through an alternator network and through a C2 capacitor to isolate any DC component present in a non-inverting input;
the alternator network includes a plurality of predetermined resistors;
the U1B op-amp is in electrical communication with a U2A comparator to sense voltage zero crossing with predetermined accuracy for communication to the DSP;
the mains line and the mains neutral line are in electrical communication with a U1D op-amp through the shunt resistor to read AC current as a voltage across the shunt resistor;
a plurality of predetermined resistors and capacitors are positioned in the electrical communication of the mains line and the mains neutral line to isolate DC component; and
the U1D op-amp is in electrical communication with a U1C amplifier and a U2B collector output to communicate current zero crossing to the DSP.

14. The efficiency-maximizing motor controller of claim 1 further comprising:
the predetermined control element contains a plurality of IGBTs to provide power factor correction and improvement by modulating each sine wave half cycle of the mains.

15. An efficiency-maximizing motor controller comprising:
an induction-motor power conveyance with which mains voltage from a power supply is in electrical communication for power to be applied to the induction motor through a shunt resistor in a mains neutral line and a predetermined control element in a mains line in electrical communication with the power supply;
the predetermined control element being selected from a class of control elements that included a triac, a field-effect transistor (FET), an insulated gate bipolar transistor device (IGBT), an SCR and a 3 quadrant triac;

a voltage analog-to-digital (A/D) converter in electrical
communication intermediate the power supply and a
digital signal processor (DSP);

mains voltage being in electrical communication to be
applied to the voltage A/D converter;

output of the voltage A/D converter being in electrical
communication to be applied to the DSP for voltage
measurement;

a volts zero-crossing detector in electrical communication
intermediate the power supply and the DSP;

mains voltage being in electrical communication to be
applied to the volts zero-crossing detector;

output of the volts zero-crossing detector being in electrical communication to be applied to the DSP for time
and phase-angle measurements of volts;

a current A/D converter in electrical communication intermediate the power supply and the DSP;

current to drive the induction motor being in electrical
communication to be monitored by the shunt resistor;

the current being in electrical communication to be
applied to the current A/D converter through the shunt
resistor;

output of the current A/D converter being in electrical
communication to be applied to the DSP for current
measurement;

a current zero-crossing detector in electrical communication intermediate the power supply and the DSP;

mains current being in electrical communication to be
applied to the current zero-crossing detector through
the shunt resistor;

output of the current zero-crossing detector being in
electrical communication to be applied to the DSP for
time and phrase-angle measurements of current;

the DSP having computer architecture to compute predetermined parameters of the induction motor selectively;

the DSP being a micro-controller for controlling current
for the induction motor in predetermined response to
the predetermined parameters of the induction motor;

an optoelectronically (opto) isolated driver in electrical
communication intermediate the DSP and the control
element; and a switching controller in electrical communication intermediate to opto isolated driver and the control element.

16. The efficiency-maximization motor controller of
claim 14 wherein:

the mains line and the mains neutral line are in electrical
communication with a U1B op-amp through an alternator network and through a C2 capacitor to isolate any
DC component present in a non-inverting input;

the alternator network includes a plurality of predetermined resistors;

the U1B op-amp is in electrical communication with a
U2A comparator to sense voltage zero crossing with
predetermined accuracy for communication to the
DSP;

the mains line and the mains neutral line are in electrical
communication with a U1D op-amp through the shunt
resistor to read AC current as a voltage across the shunt
resistor;

a plurality of predetermined resistors and capacitors are
positioned in the electrical communication of the mains
line and the mains neutral line to isolate DC component; and the U1D op-amp is in electrical communication with a
U1C amplifier and a U2B collector output to communicate current zero crossing to the DSP.

17. A use method comprising the following steps for
maximizing efficiency of the induction motor with the
efficiency-maximization motor controller:

predetermining a no-load phase angle of lag of voltage by
current for rotating the induction motor at a predetermined operational speed of rotation without motor-load
resistance in excess of the motor-load resistance inherent to the induction motor separately from motor loading that is applied to an output shaft of the induction
motor;

predetermining the current required for rotating the induction motor under a predetermined full load and having
a predetermined full-load phase angle of the lag of
voltage by current for rotating the induction motor
maximumly loaded at the predetermined operational
speed;

with the efficiency-maximization motor controller, calculating any part-load phase angle of the lag of voltage by
current for rotating the induction motor at the predetermined operational speed of rotation with any added
motor-load resistance from any part-loading that is
applied to the induction motor; and with the efficiency-maximization motor controller, calculating any part-load increase of current required for any
part-loading of the induction motor as a part-load
percent of a difference between the no-load phase angle
and the full-load phase angle.

18. The use method claim 17 wherein the efficiency-maximization motor controller includes:

an induction-motor power conveyance with which mains
voltage from a power supply is in electrical communication for power to be applied to the induction motor
through a shunt resistor in a mains neutral line and a
predetermined control element in a mains line in electrical communication with the power supply;

a voltage analog-to-digital (A/D) converter in electrical
communication intermediate the power supply and a
digital signal processor (DSP);

mains voltage being in electrical communication to be
applied to the voltage A/D converter;

output of the voltage A/D converter being in electrical
communication to be applied to the DSP for voltage
measurement;

a volts zero-crossing detector in electrical communication
intermediate the power supply and the DSP;

mains voltage being in electrical communication to be
applied to the volts zero-crossing detector;

output of the volts zero-crossing detector being in electrical communication to be applied to the DSP for time
and phase-angle measurements of volts;

a current A/D converter in electrical communication intermediate the power supply and the DSP;

current to drive the induction motor being in electrical
communication to be monitored by the shunt resistor;

the current being in electrical communication to be
applied to the current A/D converter through the shunt
resistor;

output of the current A/D converter being in electrical
communication to be applied to the DSP for current
measurement;

a current zero-crossing detector in electrical communication intermediate the power supply and the DSP;

mains current being in electrical communication to be applied to the current zero-crossing detector through the shunt resistor;

output of the current zero-crossing detector being in electrical communication to be applied to the DSP for time and phase-angle measurements of current;

the DSP having computer architecture to compute predetermined parameters of the induction motor selectively;

the DSP being a micro-controller for controlling current for the induction motor in predetermined response to the predetermined parameters of the induction motor;

an optoelectronically (opto) isolated driver in electrical communication intermediate the DSP and the control element; and a switching controller in electrical communication intermediate the opto isolated driver and the control element; and the use method comprises the additional step of directing the part-load increase of current required to the induction motor from a power supply.

* * * * *